US011178657B2

(12) United States Patent
Luo et al.

(10) Patent No.: US 11,178,657 B2
(45) Date of Patent: Nov. 16, 2021

(54) ADAPTIVE PDCCH MONITORING COMMUNICATION TECHNIQUES

(71) Applicant: QUALCOMM Incorporated, San Diego, CA (US)

(72) Inventors: Jianghong Luo, Skillman, NJ (US); Navid Abedini, Somerset, NJ (US); Junyi Li, Chester, NJ (US); Tao Luo, San Diego, CA (US); Luca Blessent, Whitehouse Station, NJ (US); Karl Georg Hampel, Hoboken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/856,463

(22) Filed: Apr. 23, 2020

(65) Prior Publication Data

US 2020/0344730 A1 Oct. 29, 2020

Related U.S. Application Data

(60) Provisional application No. 62/839,168, filed on Apr. 26, 2019.

(51) Int. Cl.
*H04W 72/04* (2009.01)
(52) U.S. Cl.
CPC ................ *H04W 72/042* (2013.01)
(58) Field of Classification Search
CPC .................................................. H04W 72/042
See application file for complete search history.

(56) References Cited

U.S. PATENT DOCUMENTS 9,237,583 B2 1/2016 Chen et al.
2012/0269115 A1* 10/2012 Esteves ................ H04L 5/0053
(Continued)

OTHER PUBLICATIONS

CATT: "PDCCH Skipping and Switching of PDCCH Monitoring Periodicity", 3GPP Draft, R2-1903126, 3rd Generation Partnership Project (3GPP), Mobile Competence Centre, 650, Route Des Lucioles, F-06921 Sophia-Antipolis Cedex, France, vol. RAN WG2, No. Xian, China, Apr. 8, 2019-Apr. 12, 2019, Apr. 6, 2019 (Apr. 6, 2019), XP051700480, 5 pages, Retrieved from the Internet: URL: http://www.3gpp.org/ftp/Meetings%5F3GPP%5FSYNC/RAN2/Docs/R2%2D1903126%2Ezip. [retrieved on Apr. 6, 2019] p. 1. paragraph 2.1 p. 3. paragraph 2.2 p. 4. paragraph 3.
(Continued)

*Primary Examiner* — Ronald B Abelson
(74) *Attorney, Agent, or Firm* — Qualcomm IP Dept.; James Hunt Yancey, Jr.

(57) ABSTRACT

Various aspects of the present disclosure generally relate to wireless communication. In some aspects, a first wireless communication device may receive an indication of a first set of non-adaptive physical downlink control channel (PDCCH), a first set of adaptive PDCCH resources, a second set of non-adaptive PDCCH resources, and a second set of adaptive PDCCH resources, may monitor the first set of non-adaptive PDCCH resources or the first set of non-adaptive PDCCH resources and the first set of adaptive PDCCH resources based at least in part on whether the first set of adaptive PDCCH resources is activated, and may transmit, based at least in part on whether the second set of adaptive PDCCH resources is activated, one or more DCI communications using the second set of non-adaptive PDCCH resources, or the second set of non-adaptive PDCCH resources and the second set of adaptive PDCCH resources. Numerous other aspects are provided.

30 Claims, 13 Drawing Sheets

(56) References Cited

U.S. PATENT DOCUMENTS

2013/0114563 A1* 5/2013 Oizumi ................. H04W 72/04
2019/0103946 A1* 4/2019 Li ............................ H04L 1/18

OTHER PUBLICATIONS

Huawei, et al., "Reduction of PDCCH Monitoring for UE Power Saving", 3GPP Draft, R1-1905453, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 2, 2019 (Apr. 2, 2019), XP051707522, 6 pages, Retrieved from the Internet: URL: http://www.3gpp.org/ftp/tsg%5Fran/WG1%5FRL1/TSGR1%5F96b/Docs/R1%2D1905453%2Ezip. [retrieved on Apr. 2, 2019] the whole document.
International Search Report and Written Opinion—PCT/US2020/029794—ISA/EPO—dated Aug. 3, 2020.

* cited by examiner

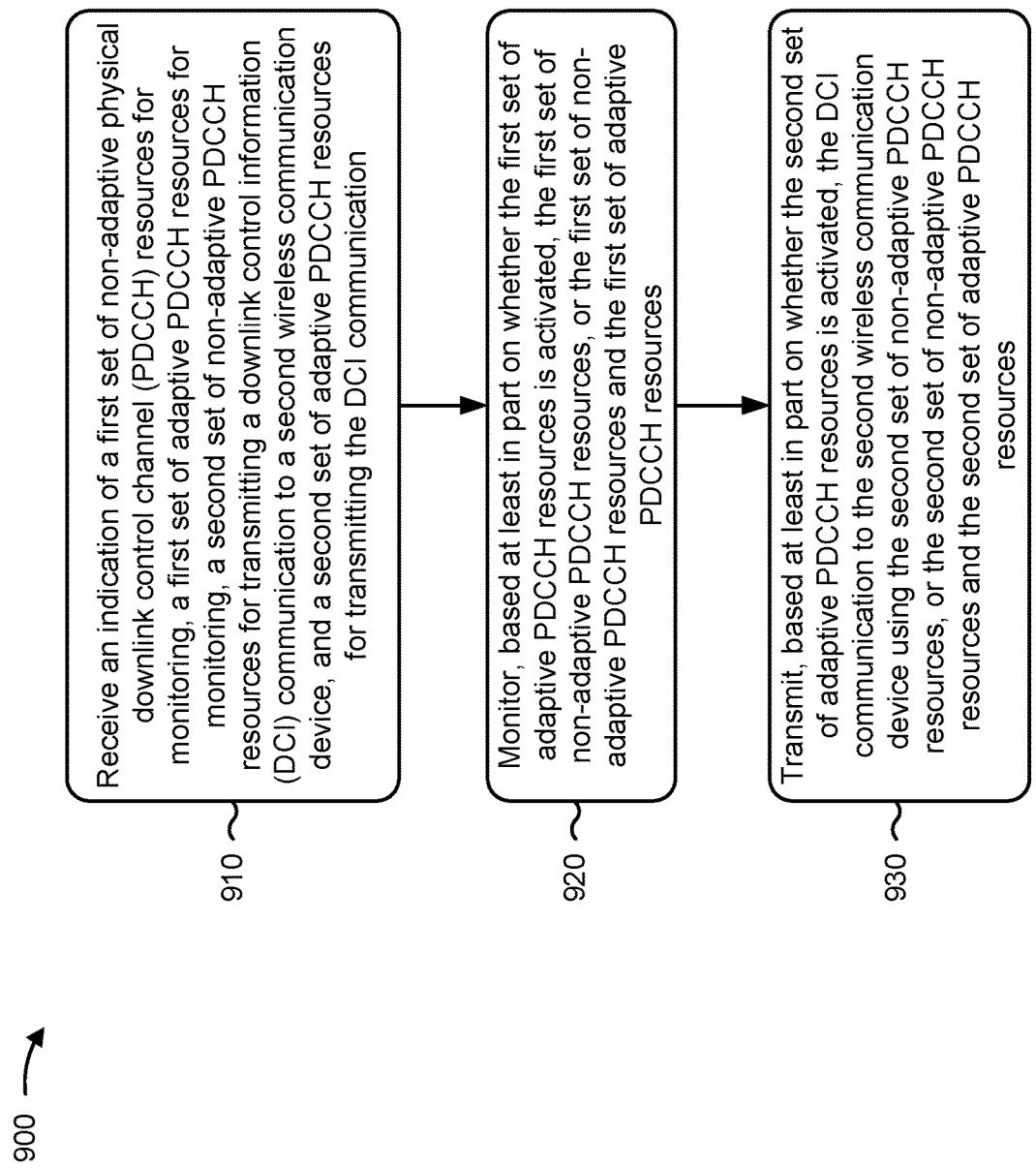

ADAPTIVE PDCCH MONITORING COMMUNICATION TECHNIQUES

CROSS-REFERENCE TO RELATED APPLICATION

This application claims priority to U.S. Provisional Patent Application No. 62/839,168, filed on Apr. 26, 2019, entitled "ADAPTIVE PDCCH MONITORING," which is hereby expressly incorporated by reference as if fully set forth below in its entirety and for all applicable purposes.

TECHNICAL FIELD

Aspects of the technology described below generally relate to wireless communication and, for example, to techniques and apparatuses for adaptive physical downlink shared channel (PDCCH) monitoring. Some techniques and apparatuses described herein enable and provide wireless communication devices and systems configured for low latency scenarios.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. A BS may be referred to as a Node B, a gNB, an access point (AP), a radio head, a transmit receive point (TRP), a New Radio (NR) BS, a 5G Node B, and/or the like.

Multiple access technologies have been adopted in various telecommunication standards. Wireless communication standards provide common protocols to enable different devices (e.g., user equipment) to communicate on a municipal, national, regional, and even global level. New Radio (NR), which may also be referred to as 5G, is a set of enhancements to the LTE mobile standard promulgated by the Third Generation Partnership Project (3GPP). As demand for mobile broadband access continues to increase, there exists a need for further improvements in LTE and NR technologies. These improvements can apply to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. The purpose of the summary is to present some concepts of one or more aspects of the disclosure in summary form as a prelude to the more detailed description that is presented later.

An integrated access and backhaul (IAB) network may include a plurality of wireless communication devices that may support various types of 5G New Radio (5G/NR) services. To support multiple types of services in a slot, a wireless communication device (e.g., an IAB donor, an IAB node, and/or the like), may multiplex traffic associated with multiple types of services in the slot using a mini-slot scheduling technique. However, if traffic associated with a particular type of 5G/NR service is sparse and/or bursty, mini-slot scheduling may result in unused resources across a plurality of slots and wasted power consumption by wireless communication devices that are to monitor the unused resources. Moreover, if the IAB network operates in half-duplex (or another type of non-full-duplex communication), the unused resources may be unable to be used for other purposes. Accordingly, and as described herein, some aspects include an IAB donor that may configure, and an IAB node that may use, a plurality of sets of physical downlink control channel (PDCCH) resources to support different types of 5G/NR services.

In some aspects, a method of wireless communication, performed by a first wireless communication device, may include receiving an indication of a first set of non-adaptive PDCCH resources for monitoring, a first set of adaptive PDCCH resources for monitoring (e.g., that may be used for monitoring after being activated), a second set of non-adaptive PDCCH resources for transmitting one or more downlink control information (DCI) communications to a second wireless communication device, and a second set of adaptive PDCCH resources for transmitting the one or more DCI communications (e.g., that may be used for transmitting after being activated); monitoring, based at least in part on whether the first set of adaptive PDCCH resources is activated, the first set of non-adaptive PDCCH resources, or the first set of non-adaptive PDCCH resources and the first set of adaptive PDCCH resources; and transmitting, based at least in part on whether the second set of adaptive PDCCH resources is activated, the one or more DCI communications to the second wireless communication device using the second set of non-adaptive PDCCH resources, or the second set of non-adaptive PDCCH resources and the second set of adaptive PDCCH resources.

In some aspects, a first wireless communication device for wireless communication may include memory and one or more processors operatively coupled to the memory. The memory and the one or more processors may be configured to receive an indication of a first set of non-adaptive PDCCH resources for monitoring, a first set of adaptive PDCCH resources for monitoring (e.g., that may be used for monitoring after being activated), a second set of non-adaptive PDCCH resources for transmitting one or more DCI communications to a second wireless communication device, and a second set of adaptive PDCCH resources for transmitting the one or more DCI communications (e.g., that may be used for transmitting after being activated); monitor, based at least in part on whether the first set of adaptive PDCCH resources is activated, the first set of non-adaptive PDCCH resources, or the first set of non-adaptive PDCCH resources and the first set of adaptive PDCCH resources; and transmit, based at least in part on whether the second set of adaptive PDCCH resources is activated, the one or more DCI communications to the second wireless communication device using the second set of non-adaptive PDCCH resources, or the second set of non-adaptive PDCCH resources and the second set of adaptive PDCCH resources.

In some aspects, a non-transitory computer-readable medium may store one or more instructions for wireless communication. The one or more instructions, when executed by one or more processors of a first wireless communication device, may cause the one or more processors to receive an indication of a first set of non-adaptive PDCCH resources for monitoring, a first set of adaptive PDCCH resources for monitoring (e.g., that may be used for monitoring after being activated), a second set of non-adaptive PDCCH resources for transmitting one or more DCI communications to a second wireless communication device, and a second set of adaptive PDCCH resources for transmitting the one or more DCI communications (e.g., that may be used for transmitting after being activated); monitor, based at least in part on whether the first set of adaptive PDCCH resources is activated. the first set of non-adaptive PDCCH resources, or the first set of non-adaptive PDCCH resources and the first set of adaptive PDCCH resources; and transmit, based at least in part on whether the second set of adaptive PDCCH resources is activated, the one or more DCI communications to the second wireless communication device using the second set of non-adaptive PDCCH resources, or the second set of non-adaptive PDCCH resources and the second set of adaptive PDCCH resources.

In some aspects, an apparatus for wireless communication may include means for receiving an indication of a first set of non-adaptive PDCCH resources for monitoring, a first set of adaptive PDCCH resources for monitoring (e.g., that may be used for monitoring after being activated), a second set of non-adaptive PDCCH resources for transmitting one or more DCI communications to a wireless communication device, and a second set of adaptive PDCCH resources for transmitting the one or more DCI communications (e.g., that may be used for transmitting after being activated); means for monitoring, based at least in part on whether the first set of adaptive PDCCH resources is activated, the first set of non-adaptive PDCCH resources, or the first set of non-adaptive PDCCH resources and the first set of adaptive PDCCH resources; and means for transmitting, based at least in part on whether the second set of adaptive PDCCH resources is activated, the one or more DCI communications to the wireless communication device using the second set of non-adaptive PDCCH resources, or the second set of non-adaptive PDCCH resources and the second set of adaptive PDCCH resources.

In some aspects, a method of wireless communication, performed by a wireless communication device, may include transmitting, to a mobile termination (MT) function of an integrated access and backhaul (IAB) node, an indication of a first set of non-adaptive PDCCH resources for monitoring and a first set of adaptive PDCCH resources for monitoring (e.g., that may be used for monitoring after being activated); and transmitting, to a distributed unit (DU) function of the IAB node, an indication of a second set of non-adaptive PDCCH resources for transmitting a DCI communication and a second set of adaptive PDCCH resources for transmitting the DCI communication (e.g., that may be used for transmitting after being activated).

In some aspects, a wireless communication device for wireless communication may include memory and one or more processors operatively coupled to the memory. The memory and the one or more processors may be configured to transmit, to an MT function of an IAB node, an indication of a first set of non-adaptive PDCCH resources for monitoring and a first set of adaptive PDCCH resources for monitoring (e.g., that may be used for monitoring after being activated); and transmit, to a DU function of the IAB node, an indication of a second set of non-adaptive PDCCH resources for transmitting a DCI communication, and a second set of adaptive PDCCH resources for transmitting the DCI communication (e.g., that may be used for transmitting after being activated).

In some aspects, a non-transitory computer-readable medium may store one or more instructions for wireless communication. The one or more instructions, when executed by one or more processors of a wireless communication device, may cause the one or more processors to: transmit, to an MT function of an IAB node, an indication of a first set of non-adaptive PDCCH resources for monitoring and a first set of adaptive PDCCH resources for monitoring (e.g., that may be used for monitoring after being activated); and transmit, to a DU function of the IAB node, an indication of a second set of non-adaptive PDCCH resources for transmitting a DCI communication and a second set of adaptive PDCCH resources for transmitting the DCI communication (e.g., that may be used for transmitting after being activated).

In some aspects, an apparatus for wireless communication may include means for transmitting, to an MT function of an IAB node, an indication of a first set of non-adaptive PDCCH resources for monitoring and a first set of adaptive PDCCH resources for monitoring (e.g., that may be used for monitoring after being activated); and means for transmitting, to a DU function of the IAB node, an indication of a second set of non-adaptive PDCCH resources for transmitting a DCI communication and a second set of adaptive PDCCH resources for transmitting the DCI communication (e.g., that may be used for transmitting after being activated).

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description is provided herein, with some aspects of the disclosure being illustrated in the appended drawings. However, the appended drawings illustrate only some aspects of this disclosure and are therefore not to be considered limiting of the scope of the disclosure. The same reference numbers in different drawings may identify the same or similar elements.

FIGS. 9 and 10 are diagrams illustrating example processes performed, for example, by a wireless communication device, in accordance with various aspects of the present disclosure.

DETAILED DESCRIPTION

Figure 1:
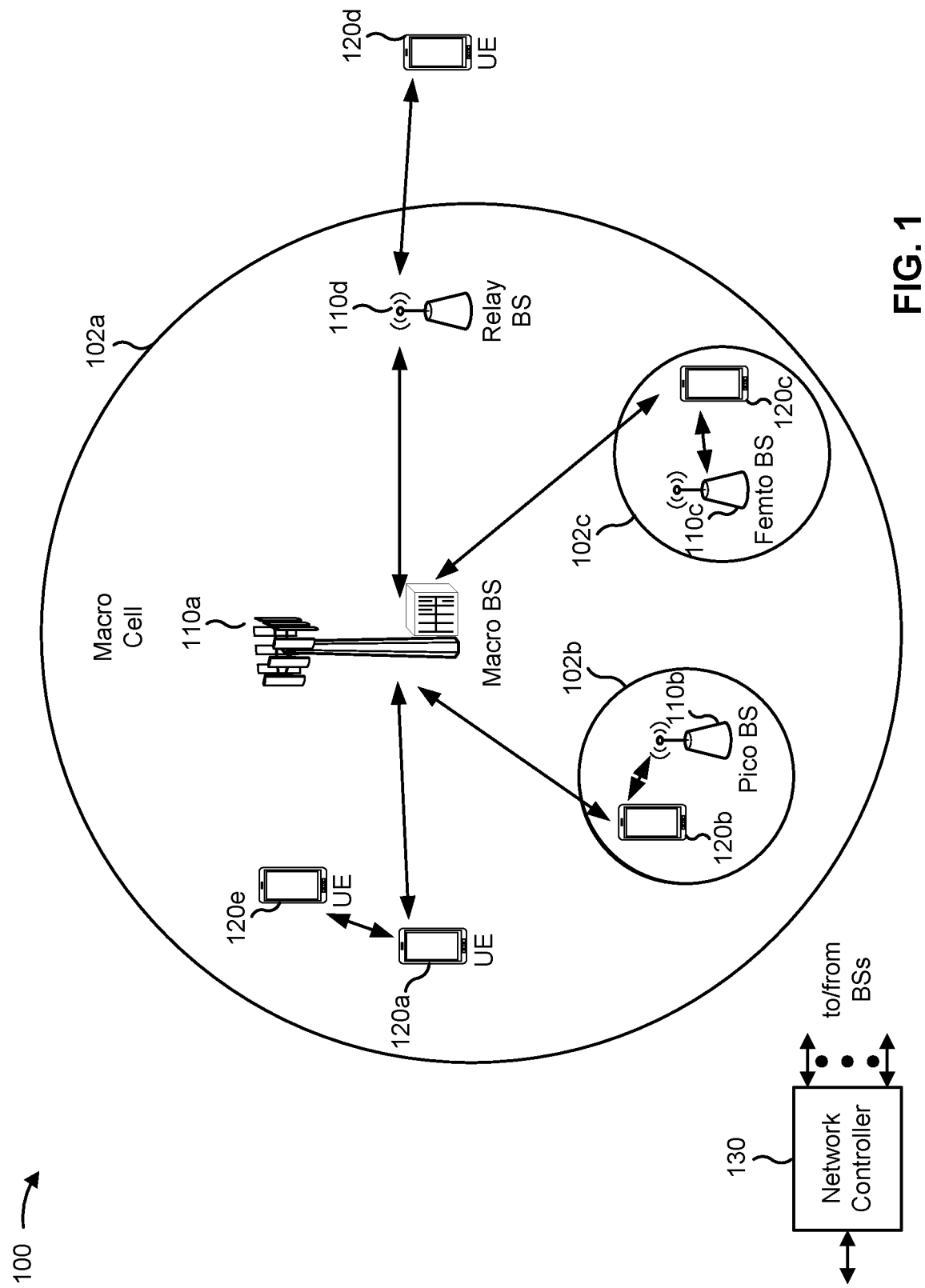
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements" or "features"). These elements may be implemented using hardware, software, or combinations thereof. Whether such elements are implemented as hardware or software depends upon the particular application and design constraints imposed on the overall system.

While some aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, RF-chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. In some deployments, a BS may be known as a scheduling entity (e.g., in that it can schedule communications of other devices). Each BS may provide communication coverage for a particular area (e.g., a fixed or changing geographical area). In some scenarios, BSs 110 may be stationary or non-stationary. In some non-stationary scenarios, mobile BSs 110 may move with varying speeds, direction, and/or heights. In 3GPP, the term "cell" can refer to a coverage area of a BS 110 and/or a BS subsystem serving this coverage area, depending on the context in which the term is used.

A BS may provide communication coverage for areas of varying sizes or ranges. BSs can be configured to enable communication in a variety of cell arrangements, including a macro cell, a pico cell, a femto cell, and/or another type of cell. A macro cell may cover a relatively large geographic area (e.g., several kilometers in radius) and may allow unrestricted access by UEs with service subscription. Additionally, or alternatively, a BS may support access to an unlicensed RF band (e.g., a Wi-Fi band and/or the like). A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary. A cell that is mobile enables a geographic area of the cell to move according to the location of a mobile BS. In some aspects, a UE can be configured to carry out BS functionality. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network. In other scenarios, BSs may be implemented in a software defined network (SDN) manner or via network function virtualization (NFV) manner.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

Moreover, at least a subset of BSs included in wireless network 100 may be deployed as an integrated access and backhaul (TAB) network. An IAB network may include an IAB donor (which may include a base station 110 that is connected to a wireline backhaul in the wireless network 100) and one or more IAB nodes (which may include one or more base stations 110 that are communicatively connected to the IAB donor and/or another IAB node via a backhaul link). A wireless communication device, such as a UE 120, may communicate with an IAB donor or IAB node via an access link. An IAB node that is downstream in the IAB network from another IAB node or an IAB donor may be referred to as a child node, and the other IAB node or IAB donor may be referred to as a parent node.

An IAB donor may include a centralized unit (CU) device and/or function and a distributed unit (DU) device and/or function. The CU may control an IAB network via configuration. The DU may schedule communication (e.g., phsycial downlink control channel (PDCCH) communication) of the IAB donors included in the IAB network. An IAB node may include a mobile termination (MT) function and/or device and a DU function and/or device. The MT may be configured to monitor for PDCCH communications transmitted from a parent node, and the DU may schedule communication (e.g., PDCCH communication) for child nodes (e.g., downstream IAB nodes, UEs 120, and/or the like).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicle component or sensor, smart meters/sensors, industrial manufacturing equipment, robotics, drones, implantable devices, augmented reality devices, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. These components may be integrated in a variety of combinations and/or may be stand-alone, distributed components considering design constraints and/or operational preferences. Further, in some deployments, UEs may be referred to as scheduled entities (e.g., in that UE communication may be scheduled by another entity (e.g., a BS or another scheduling entity).

In general, any number of wireless networks may be deployed in a given geographic area. That is, multiple wireless networks can exist and be deployed simultaneously in a given area. Some devices can be multi-mode devices and configured to communicate with multiple networks. In some deployments, devices may only operate with one network and/or with limited networks (e.g., a 5G standalone device). Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110. A UE performing scheduling operations can include or perform base-station-like functions in these deployment scenarios.

As indicated above, FIG. 1 is provided merely as an example. Other examples may differ from what is described with regard to FIG. 1.

Figure 2:
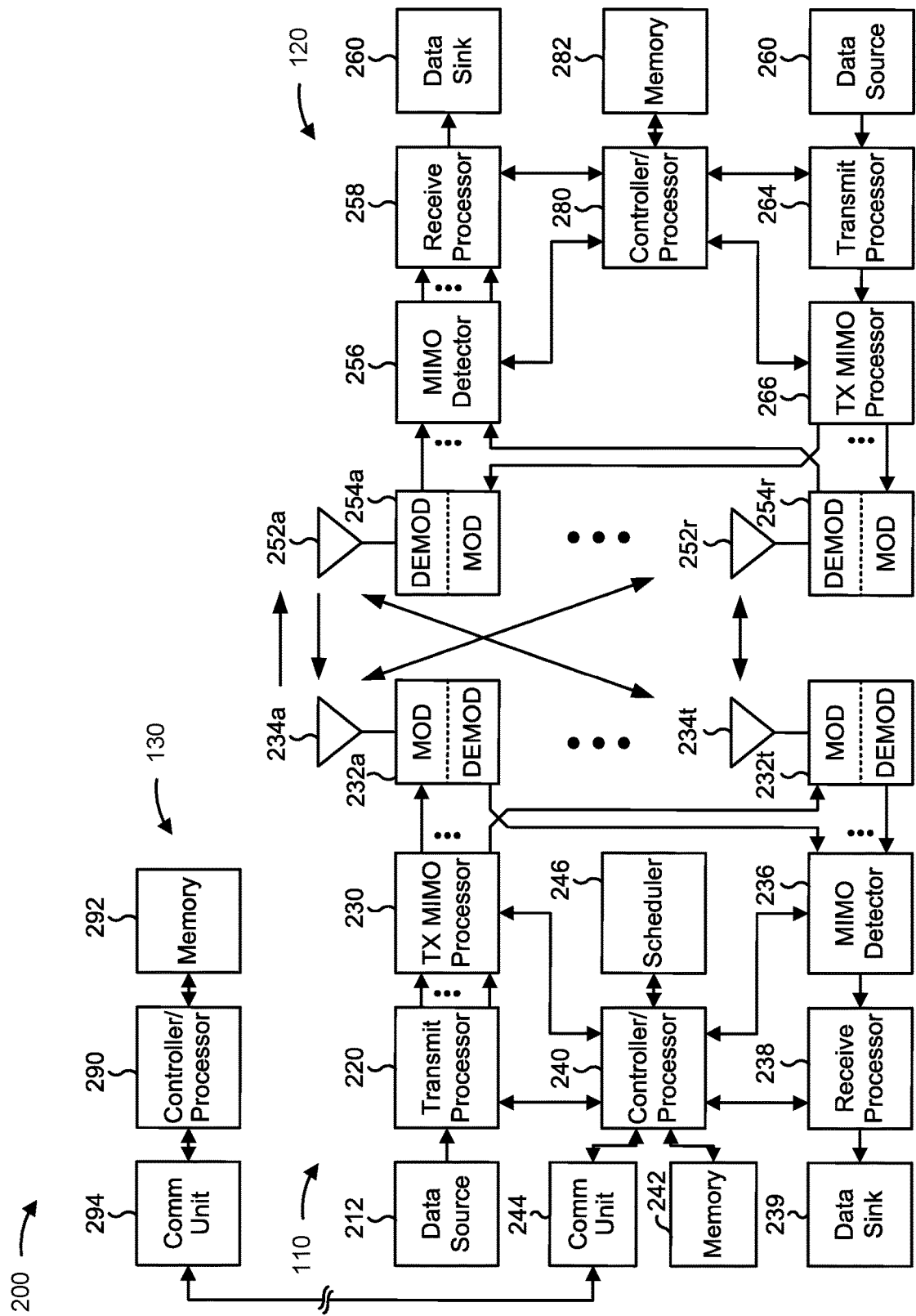
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1. The T and R antennas may be configured with multiple antenna elements formed in an array for MIMO or massive MIMO deployments that can occur in millimeter wave (mmWave or mmW) communication systems.

At base station 110, a transmit processor 220 can carry out a number of functions associated with communications. For example, transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive downlink RF signals. The downlink RF signals may be received from and/or may be transmitted by one or more base stations 110. The signals can be provided to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

For uplink communications, a UE 120 may transmit control information and/or data to another device, such as one or more base stations 110. For example, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with adaptive physical downlink control channel (PDCCH) monitoring, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. A scheduler 246 may schedule UEs for data transmission on the downlink and/or uplink.

In some aspects, the UE 120 may include a variety of structural components for carrying out functions of the various means. For example, structural components that carry out functions of such means may include one or more components of UE 120 described in connection with FIG. 2, such as antenna 252, DEMOD 254, MOD 254, MIMO detector 256, receive processor 258, transmit processor 264, TX MIMO processor 266, controller/processor 280, and/or the like.

In some aspects, the base station 110 may include a variety of means or components for implementing communication functions. For example, the variety of means may include means for receiving an indication of a first set of non-adaptive PDCCH resources for monitoring, a first set of adaptive PDCCH resources for monitoring (e.g., that may be used for monitoring after being activated by a communication from another base station 110, such as a particular communication format type or a flag/field included in the communication indicating the activation), a second set of non-adaptive PDCCH resources for transmitting a DCI communication to a second wireless communication device, and a second set of adaptive PDCCH resources for transmitting the DCI communication (e.g., that may be used for transmitting after being activated), means for monitoring, based at least in part on whether the first set of adaptive PDCCH resources is activated, the first set of non-adaptive PDCCH resources or the first set of non-adaptive PDCCH resources and the first set of adaptive PDCCH resources, means for transmitting, based at least in part on whether the second set of adaptive PDCCH resources is activated, the DCI communication to the second wireless communication device using the second set of non-adaptive PDCCH resources or the second set of non-adaptive PDCCH resources and the second set of adaptive PDCCH resources, and/or the like.

As another example, the variety of means may include means for transmitting, to a mobile termination (MT) function of an integrated access and backhaul (IAB) node, an indication of a first set of non-adaptive PDCCH resources for monitoring and a first set of adaptive PDCCH resources for monitoring (e.g., that may be used for monitoring after being activated), means for transmitting, to a distributed unit (DU) function of the IAB node, an indication of a second set of non-adaptive PDCCH resources for transmitting a DCI communication and a second set of adaptive PDCCH resources for transmitting the DCI communication (e.g., that may be used for transmitting after being activated), and/or the like.

In some aspects, the base station 110 may include a variety of structural components for carrying out functions of the various means. For example, structural components that carry out functions of such means may include one or more components of base station 110 described in connection with FIG. 2, such as transmit processor 220, TX MIMO processor 230, DEMOD 232, MOD 232, antenna 234, MIMO detector 236, receive processor 238, controller/processor 240, and/or the like.

As indicated above, FIG. 2 is provided merely as an example. Other examples may differ from what is described with regard to FIG. 2.

Figure 3A:
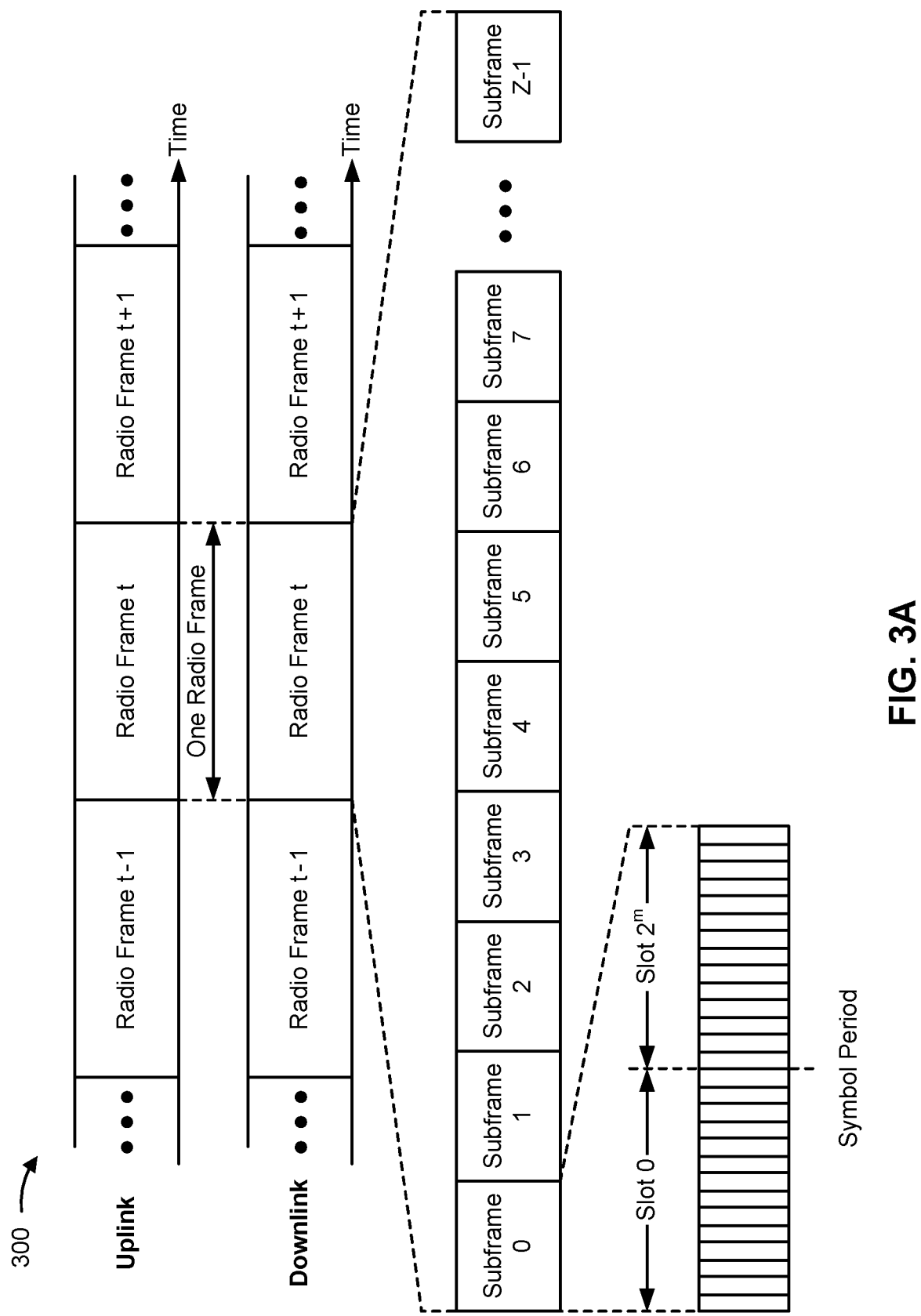
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures. These additional structural types may be referred to using terms other than "frame," "subframe," "slot," and/or the like in 5G NR. In some aspects, a wireless communication structure may refer to a periodic time-bounded communication unit defined by a wireless communication standard and/or protocol (e.g., protocol unit, protocol data unit). Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
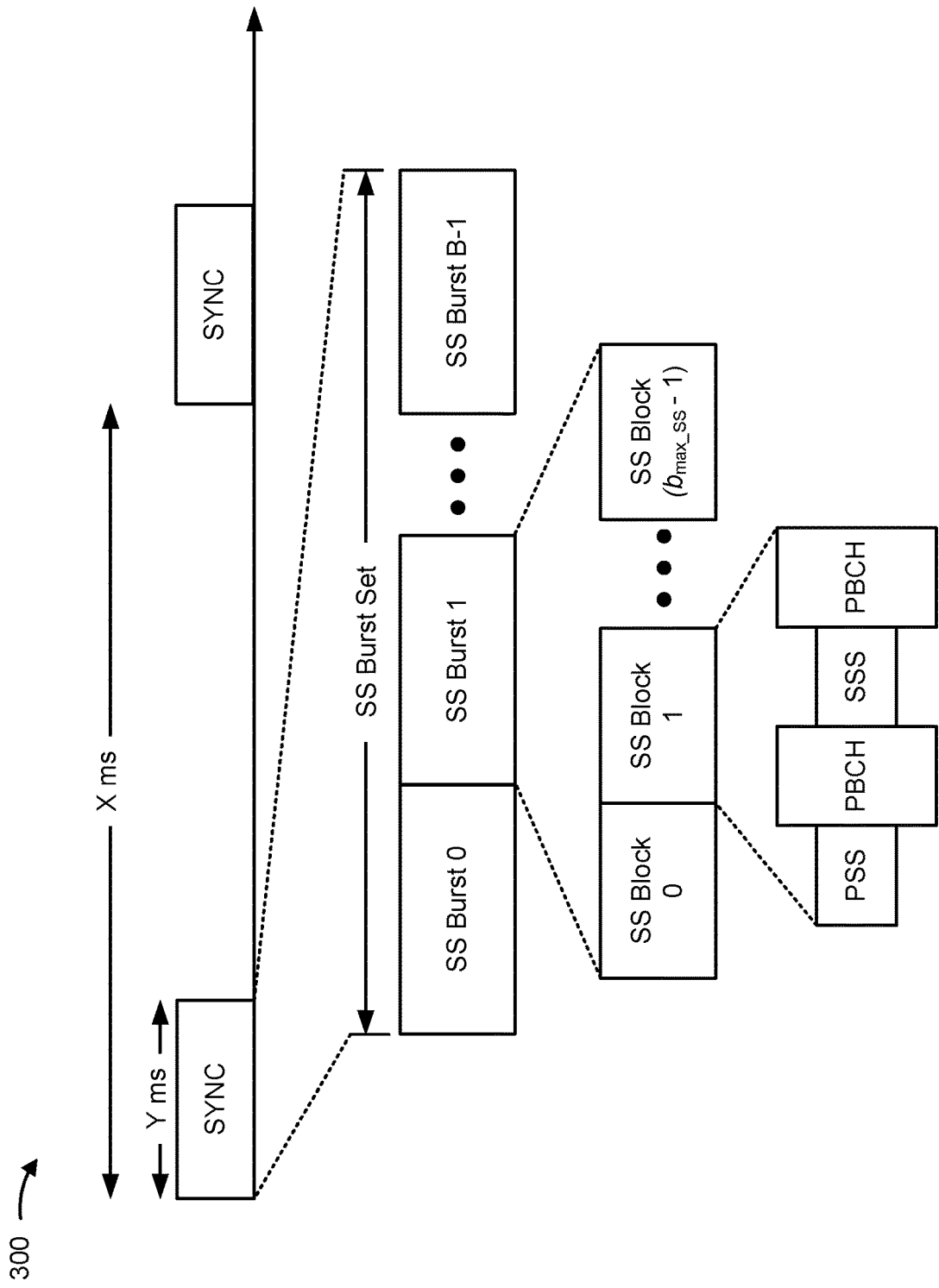
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, and the SS blocks of the SS burst are transmitted. A base station can transmit SS burst transmissions (e.g., according to a burst period). In some scenarios, one or more SS blocks may be repeated during each SS burst. In some aspects, the SS burst set may have a burst set periodicity, SS bursts of the SS burst set may be transmitted by a base station according to a fixed burst set periodicity. In some deployments, one or more SS bursts may be repeated during each SS burst set.

The base station may transmit system information. This system information may include system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
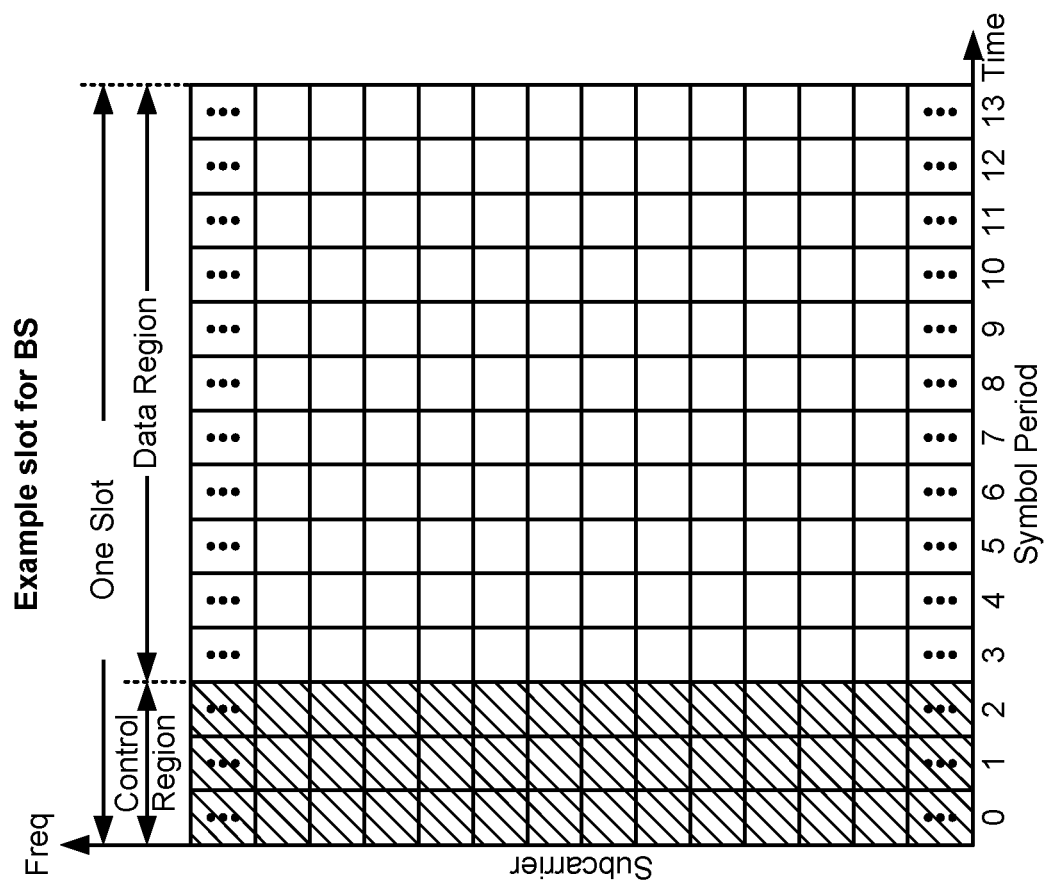
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
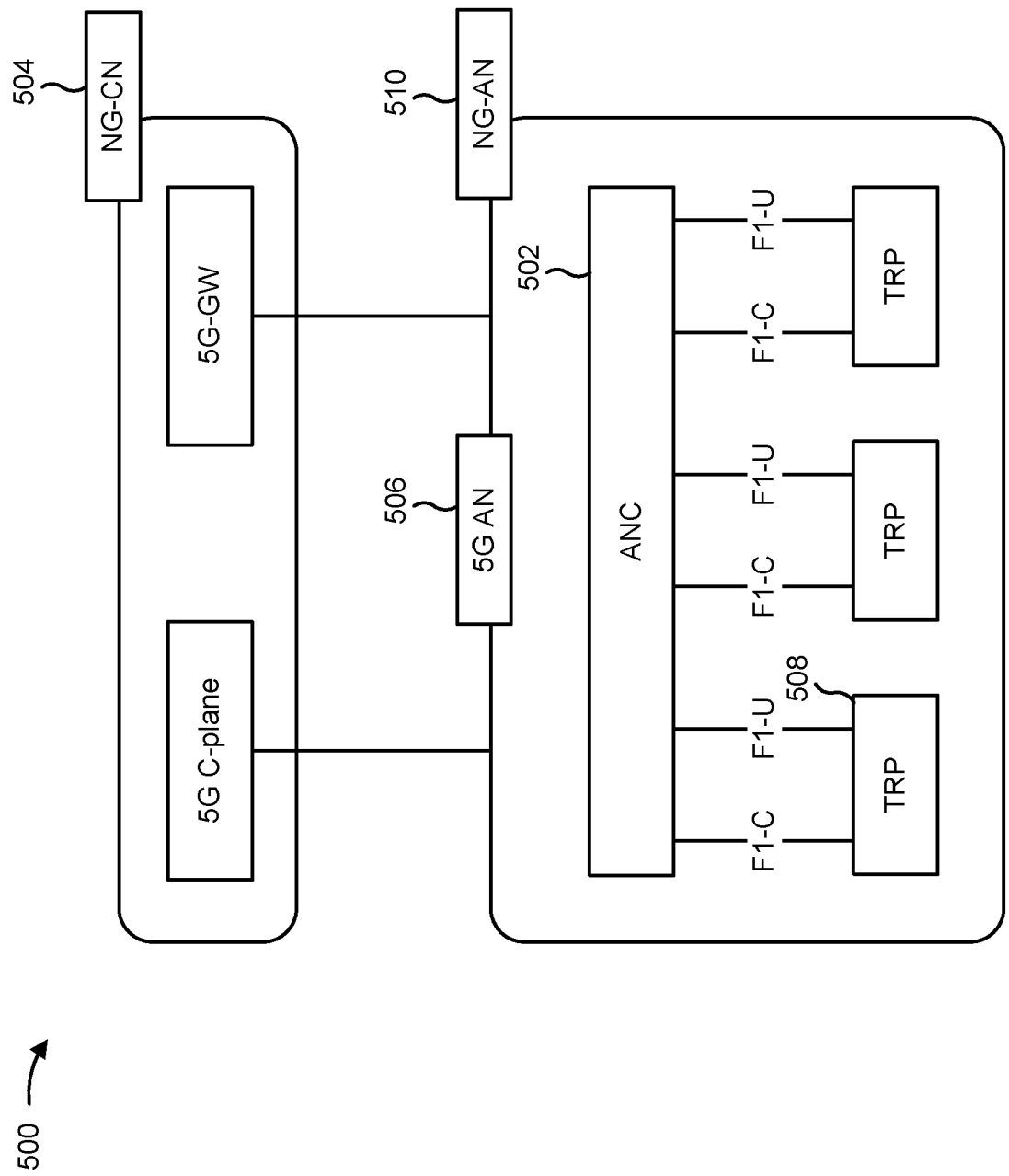
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, "TRP" may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), and/or media access control (MAC) protocol may be adaptably placed at the ANC or TRP.

According to various aspects, a BS may include a CU (e.g., ANC 502 or an IAB donor) and/or one or more DUs (e.g., one or more TRPs 508 or IAB nodes).

As indicated above, FIG. 5 is provided merely as an example. Other examples may differ from what is described with regard to FIG. 5.

Figure 6:
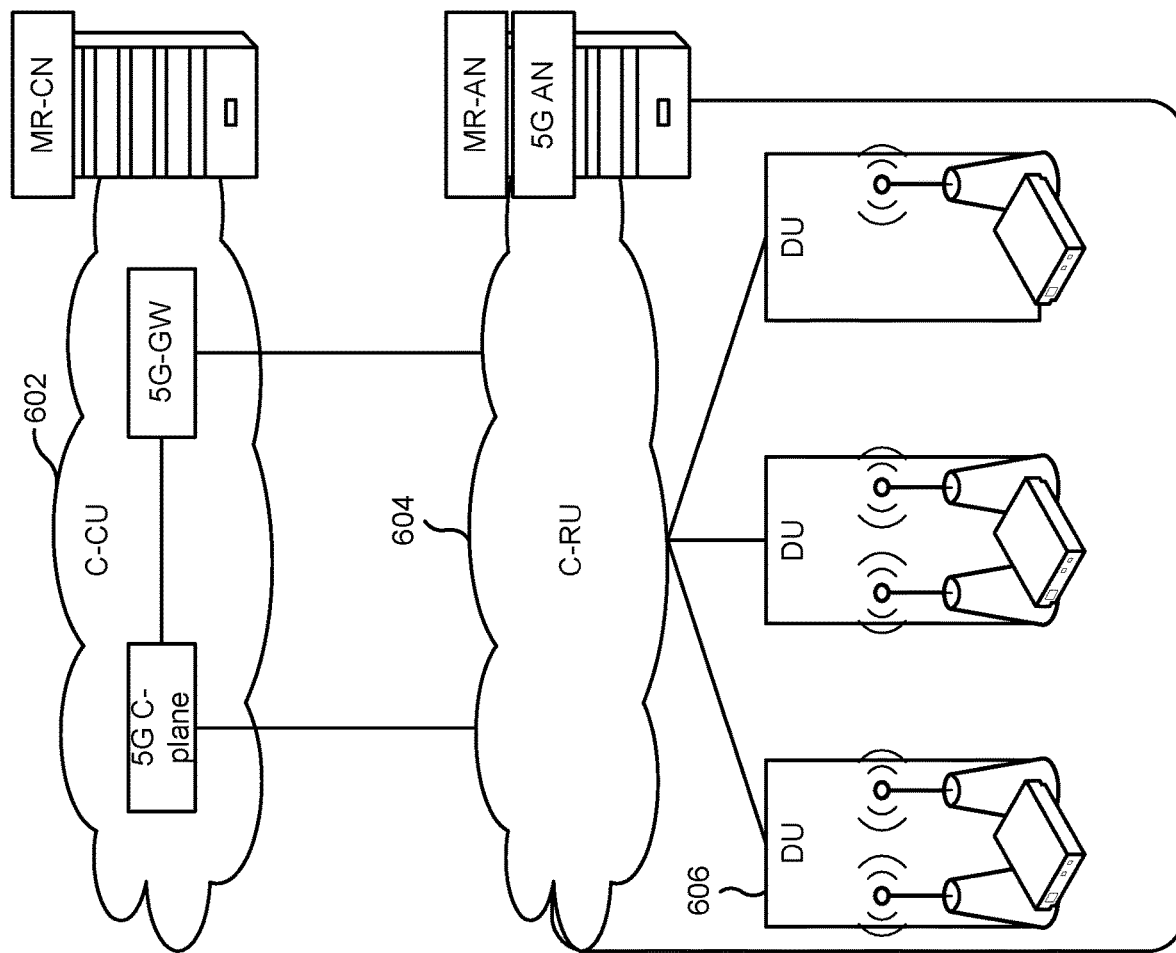
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs or IAB nodes. The DU may be located at edges of the network with radio frequency (RF) functionality.

As indicated above, FIG. 6 is provided merely as an example. Other examples may differ from what is described with regard to FIG. 6.

In some cases, an IAB network (and the IAB donor and IAB nodes included therein) may be configured to provide various types of 5G/NR services, such as an eMBB service, an URLLC service, an mMTC service, and/or the like. In some cases, an IAB network may be configured to support multiple types of 5G/NR services. In this case, the IAB network may be configured to multiplex eMBB traffic and URLLC traffic in a given slot.

To support multiplexing of eMBB traffic and URLLC traffic, an IAB network may use a mini-slot based scheduling technique. Mini-slot based scheduling may include allocating flexible PDSCH starting locations and lengths in a slot, and allocating PDCCH monitoring occasions with flexible starting locations in a slot. To reduce the latency of URLLC traffic, an IAB node or IAB donor may use mini-slot based scheduling to puncture on-going eMBB traffic with URLLC traffic.

While mini-slot based scheduling in an IAB network may be used to achieve low latency for URLLC traffic, the flexibility of mini-slot based scheduling may be limited if an IAB network operates in half-duplex (or another type of non-full-duplex communication). For example, PDCCH resources that are scheduled for communication between an IAB node and a parent node of the IAB node may not be available for communication between the IAB node and a child node of the IAB node. Since URLLC traffic may be sparse and/or bursty, PDCCH resources that are scheduled for URLLC traffic may be unused across a plurality of slots, which decreases the utilization of the PDCCH resources and prevents the PDCCH resources from being used for other types of 5G/NR services such as eMBB. Moreover, an IAB node may perform blind decoding of PDCCH resources that are scheduled for URLLC traffic even if the PDCCH resources are unused across a plurality of slots, which causes wasted power consumption at the IAB node.

Some aspects, described herein, provide techniques and apparatuses for adaptive PDCCH monitoring. In some aspects, an IAB donor may configure a plurality of sets of PDCCH resources in dynamic fashion. Changing or modifying PDCCH resources can enable adapting PDCCH resources as desired for use in various communication scenarios. Adapting resources may be accomplished by activating or deactivating control channel resources (e.g., setting indications and or symbol-level elements to activated and/or de-activated states). In some scenarios, one or more sets of PDCCH resources may be activated (e.g., dynamically activated). Activation and/or deactivation may be implemented by signaling that turns on and off certain control signal elements in some deployments. Activation can occur for various types of traffic, such as, for example, URLLC traffic. An IAB node may use a first set of non-adaptive PDCCH resources and a first set of adaptive PDCCH resources to communicate with a parent node. The first set of adaptive PDCCH resources can be activated. The IAB node may use the first set of non-adaptive PDCCH resources to communicate with the parent node; in some cases this may occur with the first set of adaptive PDCCH resources being deactivated. The IAB node may also use a second set of non-adaptive PDCCH resources and a second set of adaptive PDCCH resources to communicate with a child node when the second set of adaptive PDCCH resources is activated, and may use the second set of non-adaptive PDCCH resources to communicate with the child node with the second set of adaptive PDCCH resources is deactivated.

Resource activation may occur in various manners and enable flexible, dynamic scheduling. For example, use of activated and deactivated PDCCH resources may permit PDCCH resources to be flexibly scheduled and, using mini-slot based scheduling, used for traffic associated with various types of 5G/NR services. For example, an IAB donor or IAB node may activate sets of adaptive PDCCH resources. In some scenarios, activation may include using certain control signaling fields or flags as well as indicating presence and/or absence of certain information in signaling or indications of signaling. In some scenarios, activation may be carried out through the use of particular types or formats of control signaling. Activating PDCCH resources can enable an IAB donor and/or node to facilitate URLLC traffic to be transmitted through the IAB network. This can result in URLLC traffic with low latency while using sets of non-adaptive PDCCH resources for scheduling eMBB traffic through the IAB network.

Figure 7:
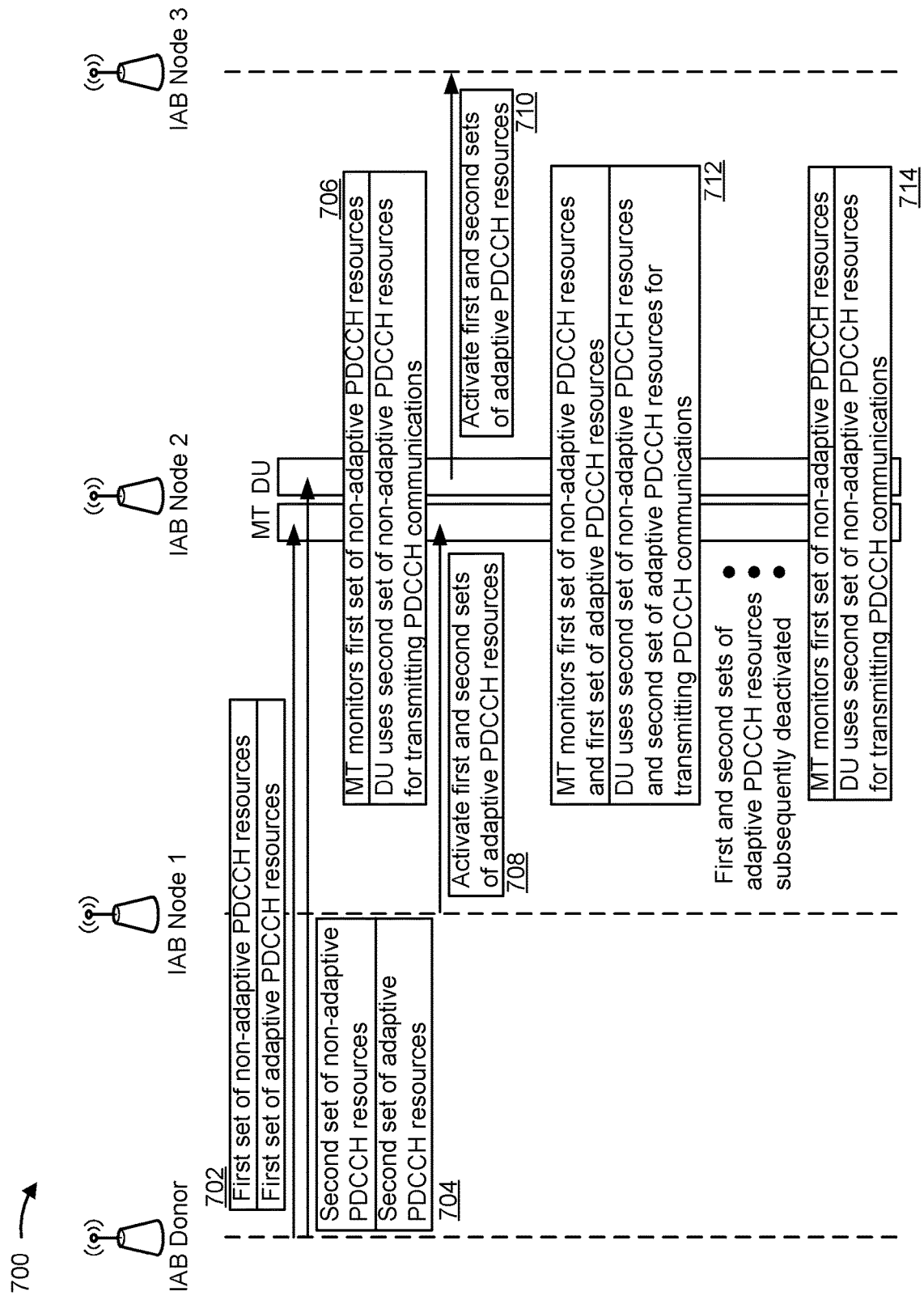
FIGS. 7-8C are diagrams illustrating one or more examples of adaptive physical downlink control channel monitoring, in accordance with various aspects of the present disclosure.

FIG. 7 is a diagram illustrating one or more examples 700 of adaptive PDCCH monitoring, in accordance with various aspects of the present disclosure. As shown in FIG. 7, examples 700 may include a plurality of IAB devices, such as an IAB donor and a plurality of IAB nodes (e.g., IAB nodes 1-3). In some aspects, the plurality of IAB devices may be implemented by one or more base stations (e.g., BS 110) and/or one or more UEs (e.g., UE 120).

The IAB donor and the plurality of IAB nodes may be included in an IAB network. The IAB donor may be connected to a wireless network via a wireline backhaul. IAB node 1 may be communicatively connected with the IAB donor via a backhaul link, IAB node 2 may be communicatively connected with the IAB node 2 via a backhaul link, and IAB node 3 may be communicatively connected with the IAB node 2 via a backhaul link. UEs and/or other wireless communication devices may communicatively connect with the IAB devices via access links.

The plurality of IAB nodes may include one or more parent nodes and one or more child nodes. For example, IAB node 1 may be a parent node of IAB node 2, and IAB node 3 may be a child node of IAB node 2. Each IAB node may include an MT function and/or device and a DU function and/or device. As described above, the MT may be configured to monitor for PDCCH communications transmitted from a parent node, and the DU may schedule communication (e.g., PDCCH communication) for child nodes (e.g., downstream IAB nodes, UEs, and/or the like).

The IAB donor may include a CU function and/or device and a DU function and/or device. As described above, the CU may control the IAB network via PDCCH resource configuration, and the DU may dynamically schedule communication between the IAB donors included in the IAB network.

To control the IAB network via PDCCH resource configuration for a plurality of types of services (e.g., 5G/NR services, such as an eMBB service, a URLLC service, an mMTC service, and/or the like), the IAB donor may configure a plurality of sets of PDCCH resources. A set of PDCCH resources may include one or more PDCCH occasions. A PDCCH occasion may include a time-frequency resource in which a PDCCH communication may be transmitted and/or received. The IAB donor and/or IAB nodes may use PDCCH occasions included in the plurality of sets of PDCCH resources for mini-slot based scheduling of data channels such as physical downlink shared channels (PDSCHs), physical uplink shared channels (PUSCHs), and/or the like.

As shown in FIG. 7, and by reference number 702, to configure IAB node 2 with a plurality of sets of PDCCH resources, the IAB donor may transmit, to IAB node 2, an indication of a first set of non-adaptive PDCCH resources and a first set of adaptive PDCCH resources. The first set of non-adaptive PDCCH resources may include one or more PDCCH occasions that are to be used for normal monitoring and do not need to be activated and/or deactivated by a parent node. The first set of adaptive PDCCH resources may include one or more PDCCH occasions that are to be used for adaptive monitoring by the MT of IAB node 2. In this case, the parent node of IAB node 2 (e.g., IAB node 1) may activate and/or deactivate the first set of adaptive PDCCH resources. Accordingly, the MT of IAB node 2 monitors only the first set of non-adaptive PDCCH resources for PDCCH communications from the parent node when the first set of adaptive PDCCH resources is deactivated, and monitors the first set of non-adaptive PDCCH resources and the first set of adaptive PDCCH resources when the first set of adaptive PDCCH resources is activated.

In some aspects, the first set of non-adaptive PDCCH resources and the first set of adaptive PDCCH resources may be non-overlapping PDCCH resources in the time domain and/or frequency domain. In some aspects, the first set of non-adaptive PDCCH resources and the first set of adaptive PDCCH resources may be interleaved. In some aspects, the periodicity of the first set of non-adaptive PDCCH resources may be larger relative to the periodicity of the first set of adaptive PDCCH resources. In this case, IAB donor may configure the first set of non-adaptive PDCCH resources for scheduling eMBB traffic, and may configure the first set of adaptive PDCCH resources for scheduling URLLC traffic.

As further shown in FIG. 7, and by reference number 704, the IAB donor may transmit, to IAB node 2, an indication of a second set of non-adaptive PDCCH resources and a second set of adaptive PDCCH resources. The DU of IAB node 2 may use the second set of non-adaptive PDCCH resources for normal scheduling of PDCCH communications with IAB node 3 and/or other child nodes. In this case, the second set of non-adaptive PDCCH resources do not need to be activated and/or deactivated by IAB node 2 in order for IAB node 2 to transmit PDCCH communications using the second set of non-adaptive PDCCH resources. IAB node 2 may use the second set of adaptive PDCCH resources for adaptively transmitting PDCCH communications to IAB node 3 and/or other child nodes. In this case, if the parent node of IAB node 2 (e.g., IAB node 1) activates or deactivates the second set of adaptive PDCCH resources for IAB node 2, IAB node 2 may activate or deactivate the second set of adaptive PDCCH resources for IAB node 3.

Accordingly, the DU of IAB node 2 may transmit PDCCH communications using (and may configure IAB node 3 to monitor) only the second set of non-adaptive PDCCH resources when the second set of adaptive PDCCH resources is deactivated, and may transmit PDCCH communications using (and may configure IAB node 3 to monitor) the second set of non-adaptive PDCCH resources and the second set of adaptive PDCCH resources when the second set of adaptive PDCCH resources is activated.

In some aspects, the second set of non-adaptive PDCCH resources and the second set of adaptive PDCCH resources may be non-overlapping PDCCH resources in the time domain and/or frequency domain. In some aspects, the second set of non-adaptive PDCCH resources and the second set of adaptive PDCCH resources may be interleaved. In some aspects, the periodicity of the second set of non-adaptive PDCCH resources may be larger relative to the periodicity of the second set of adaptive PDCCH resources. In this case, IAB donor may configure the second set of non-adaptive PDCCH resources for scheduling eMBB traffic, and may configure the second set of adaptive PDCCH resources for scheduling URLLC traffic.

In some aspects, the first set of non-adaptive PDCCH resources and the second set of non-adaptive PDCCH resources may be configured to be non-overlapping PDCCH resources, and the first set of adaptive PDCCH resources and the second set of adaptive PDCCH resources may be configured to be non-overlapping PDCCH resources if the IAB network operates in half-duplex (or non-full-duplex). In this way, the MT of IAB node 2 is configured with an adequate amount of PDCCH resources for monitoring and receiving PDCCH communications from the parent node (e.g., IAB node 1), and the DU of IAB node 2 is configured with an adequate amount of PDCCH resources for transmitting PDCCH communications to child nodes (e.g., IAB node 3).

In some aspects, the first set of adaptive PDCCH resources and the second set of adaptive PDCCH resources may be non-overlapping PDCCH resources in the time domain and/or frequency domain. In some aspects, the first set of adaptive PDCCH resources and the second set of adaptive PDCCH resources may be interleaved. In some aspects, the first set of adaptive PDCCH communications and the second set of PDCCH communications may be configured such that the first set of adaptive PDCCH resources and the second set of adaptive PDCCH resources share time domain and/or frequency domain resources in the activation period. In this case, the shared time domain and/or frequency domain resources may be flexible time domain and/or frequency domain resources in that IAB node 2 may flexibly use the time domain and/or frequency domain resources to receive PDCCH communications from the parent node or transmit PDCCH communications to child nodes.

As further shown in FIG. 7, and by reference number 706, the first set of adaptive PDCCH resources and the second set of adaptive PDCCH resources may be deactivated (e.g., by default). Accordingly, the MT of IAB node 2 may monitor the first set of non-adaptive PDCCH resources, and the DU of IAB node 2 may use the second set of non-adaptive PDCCH resources for transmitting PDCCH communications to IAB node 3. Alternatively, the first set of adaptive PDCCH resources and the second set of adaptive PDCCH resources may be activated (e.g., by default), and the parent node IAB node 2 (e.g., IAB node 1) may deactivate the first set of adaptive PDCCH resources and the second set of adaptive PDCCH resources such that the MT of IAB node 2 may monitor the first set of non-adaptive PDCCH resources, and the DU of IAB node 2 may use the second set of non-adaptive PDCCH resources for transmitting PDCCH communications to IAB node 3.

IAB node 2 may monitor the first set of non-adaptive PDCCH resources for PDCCH communications transmitted from the parent node (e.g., IAB node 1). The PDCCH communications may include DCI communications, downlink medium access control (MAC) control element (MAC-CE) communications, and/or the like. To monitor the first set of non-adaptive PDCCH resources, IAB node 2 may perform blind decoding of the PDCCH occasions included in the first set of non-adaptive PDCCH resources to determine whether the parent node transmitted a PDCCH communication in any of the PDCCH occasions.

IAB node 2 may transmit PDCCH communications (e.g., DCI communications, downlink MAC-CE communications, and/or the like) to IAB node 3 by transmitting a PDCCH communication in one or more PDCCH occasions included in the second set of non-adaptive PDCCH resources. IAB node 3 may monitor the second set of non-adaptive PDCCH resources and may perform blind decoding of the PDCCH occasions included in the second set of non-adaptive PDCCH resources to identify the PDCCH communication.

As further shown in FIG. 7, and by reference number 708, the parent node of IAB node 2 (e.g., IAB node 1) may transmit, to IAB node 2, a communication that activates the first set of adaptive PDCCH resources and the second set of adaptive PDCCH resources. The communication may activate the first set of adaptive PDCCH resources and the second set of adaptive PDCCH resources in that the communication indicates that the first set of adaptive PDCCH resources and the second set of adaptive PDCCH resources are permitted for use by IAB node 2.

IAB node 2 may receive the communication that activates the first set of adaptive PDCCH resources and the second set of adaptive PDCCH resources, and may accordingly use the first set of adaptive PDCCH resources and the second set of adaptive PDCCH resources. The MT of IAB node 2 may monitor, based at least in part on receiving the communication, the first set of non-adaptive PDCCH resources and the first set of adaptive PDCCH resources for PDCCH communications transmitted from the parent node. The DU of IAB node 2 may use, based at least in part on receiving the communication, the second set of non-adaptive PDCCH resources and the second set of adaptive PDCCH resources to transmit PDCCH communications to IAB node 3 and/or other child nodes.

In some aspects, the communication may include a DCI communication, a downlink MAC-CE communication, and/or the like. In some aspects, the communication may be transmitted in the first set of non-adaptive PDCCH resources, in other PDCCH resources, in PDSCH resources, and/or the like. In some aspects, if the communication is a DCI communication, the DCI communication may be a particular DCI format that is associated with activating sets of adaptive PDCCH resources. In some aspects, if the communication is a DCI communication, the DCI communication may be a DCI grant format that includes one or more fields or flags that include an indication that the first set of adaptive PDCCH resources and the second set of adaptive PDCCH resources are activated.

In some aspects, the communication may specify one or more parameters for activating and/or deactivating the first set of adaptive PDCCH resources and/or the second set of adaptive PDCCH resources. For example, the one or more parameters may include a parameter that indicates an activation period during which the second set of adaptive PDCCH resources is activated (e.g., a quantity of symbols included in the activation period, a starting time or symbol and/or ending time or symbol of the activation period, a quantity of symbols between receiving the communication and the starting symbols of the activation period, and/or the like). Additionally and/or alternatively, IAB node 2 may be hard-coded, semi-statically configured, and/or the like with information (e.g., a specification, a table, and/or the like) indicating the quantity of symbols between receiving the communication and the starting symbols of the activation period. In some aspects, the quantity of symbols between receiving the communication and the starting symbols of the activation period may be a semi-statically configured variable that may be based at least in part on a quantity of IAB nodes between IAB node 2 and the IAB donor. Additionally and/or alternatively, IAB node 2 may be hard-coded, semi-statically configured, and/or the like with information (e.g., a specification, a table, and/or the like) indicating a value or semi-static configured variable for the starting time or symbol of the activation period.

As another example, the one or more parameters may include a parameter indicating whether all or a subset of the first set of adaptive PDCCH resources and/or the second set of adaptive PDCCH resources is to be activated during the activation period. In this case, the parent node may activate a subset of the first set of adaptive PDCCH resources and/or the second set of adaptive PDCCH resources to balance between achieving high resource utilization for eMBB traffic and achieving low latency for URLLC traffic.

As another example, the one or more parameters may include a parameter indicating a PDCCH blind decoding configuration for the activation period (e.g., a quantity of blind decodes that IAB node 2 is permitted to perform during the activation period, which may be the same as or different from a quantity of blind decodes that IAB node 2 is permitted to perform outside of the activation period). Additionally and/or alternatively, IAB node 2 may be hard-coded, semi-statically configured, and/or the like with information (e.g., a specification, a table, and/or the like) indicating that IAB node 2 is to adjust a PDCCH blind coding configuration during the activation period.

As another example, the one or more parameters may include a parameter indicating a control channel element (CCE) configuration for the activation period (e.g., a quantity of CCEs included in a PDCCH transmission during the activation period, which may be the same as or different from a quantity of CCEs included in a PDCCH transmission outside of the activation period). Additionally and/or alternatively, IAB node 2 may be hard-coded, semi-statically configured, and/or the like with information (e.g., a specification, a table, and/or the like) indicating that IAB node 2 is to adjust a CCE configuration during the activation period.

As another example, the one or more parameters may include a parameter indicating whether IAB node 2 is to transmit, to IAB node 3 and/or other child nodes, a communication that activates the second set of adaptive PDCCH resources for IAB node 3 and/or other child nodes. In some aspects, if the one or more parameters include a parameter indicating that IAB node 2 is to transmit a communication that activates the second set of adaptive PDCCH resources for IAB node 3, the one or more parameters may include a parameter indicating an identifier associated with IAB node 3.

In some aspects, the parent node of IAB node 2 (e.g., IAB node 1) or the IAB donor may transmit the communication that activates the first set of adaptive PDCCH resources and/or the second set of adaptive PDCCH resources based on various factors. For example, the IAB donor may transmit, to the MT of IAB node 2, the communication based at least in part on receiving an indication that a wireless communication device is preparing to transmit URLLC traffic along a route that includes IAB node 2. As another example, the parent node may transmit, to the MT of IAB node 2, the communication based at least in part on receiving a first URLLC communication of a plurality of URLLC communications from a wireless communication device.

As further shown in FIG. 7, and by reference number 710, IAB node 2 may transmit, to IAB node 3, a communication that activates the second set of adaptive PDCCH resources for IAB node 3. In some aspects, if the IAB donor or parent node of IAB node 2 (e.g., IAB node 1) originates the communication that activates the first set of adaptive PDCCH resources and/or the second set of adaptive PDCCH resources, IAB node 2 may receive the communication, update the communication, and transmit the communication to IAB node 3. In this case, the communication that activates the second set of adaptive PDCCH resources for IAB node 3 may include the one or more parameters for activating and/or deactivating the second set of adaptive PDCCH resources described above.

In some aspects, IAB node 2 may further include, in the communication that activates the second set of adaptive PDCCH resources for IAB node 3, an indication that the first set of adaptive PDCCH resources has been activated for IAB node 2. If the IAB network operates in half-duplex (or non-full-duplex), the MT of IAB node 2 and the DU of IAB node 2 may not use the same PDCCH resources at the same time. In this case, if IAB node 3 is aware that the first set of adaptive PDCCH resources for MT monitoring has been activated for IAB node 2, IAB node 3 may be aware that there will be no communication from the DU of IAB node 2 over the first set of adaptive PDCCH resources since the MT of IAB node 2 may be monitoring the first set of adaptive PDCCH resources. Accordingly, the MT of IAB node 3 may use the PDCCH resources included in the first set of adaptive PDCCH resources of IAB node 2 for other purposes while the MT of IAB node 2 is monitoring the first set of adaptive PDCCH resources for PDCCH communications from the IAB node 1. The other purposes may include interference measurements, reference signal measurements, and/or the like.

In some aspects, IAB node 2 may further activate additional sets of adaptive PDCCH resources for IAB node 3. For example, IAB node 2 may transmit a communication that activates the second set of adaptive PDCCH resources for the MT of IAB node 3, and activates a third set of adaptive PDCCH resources for the DU of IAB node 3. IAB node 3 and additional IAB nodes may activate PDCCH resources for child nodes along the signal path in a similar manner. In some aspects, the MT's of IAB nodes along a signal path may use the same set of adaptive PDCCH resources and/or different sets of adaptive PDCCH resources, and/or the DU's of the IAB nodes along the signal path may use the same set of adaptive PDCCH resources and/or different sets of adaptive PDCCH resources.

As further shown in FIG. 7, and by reference number 712, the MT of IAB node 2 may monitor, based at least in part on the first set of adaptive PDCCH resources being activated, the first set of non-adaptive PDCCH resources and the first set of adaptive PDCCH resources for PDCCH communications transmitted from the parent node of IAB node 2 (e.g., IAB node 1). For example, the MT of IAB node 2 may perform (e.g., during the activation window, until a deactivation communication is received, and/or the like) blind decoding of the PDCCH occasions included in the first set of non-adaptive PDCCH resources and the first set of adaptive PDCCH resources to detect PDCCH communications transmitted from the parent node.

Moreover, the DU of IAB node 2 may use, based at least in part on the second set of adaptive PDCCH resources being activated, the second set of non-adaptive PDCCH resources and the second set of adaptive PDCCH resources for transmitting PDCCH communications to IAB node 3 and/or other child nodes. For example, the DU of IAB node 2 may use (e.g., during the activation window, until a deactivation communication is received, and/or the like) the PDCCH occasions included in the second set of non-adaptive PDCCH resources and the second set of adaptive PDCCH resources to transmit PDCCH communications to IAB node 3 and/or other child nodes.

In some aspects, the first set of adaptive PDCCH resources and the second set of adaptive PDCCH resources may be subsequently deactivated (e.g., at a time after the first set of adaptive PDCCH resources and the second set of adaptive PDCCH resources were activated). The first set of adaptive PDCCH resources and/or the second set of adaptive PDCCH resources may be deactivated via explicit signaling (e.g., the parent node of IAB node 2 (e.g., IAB node 1) may transmit a communication that deactivates the first set of adaptive PDCCH resources and/or the second set of adaptive PDCCH resources) or may be automatically deactivated by IAB node 2. Similarly, IAB node 2 may deactivate the second set of adaptive PDCCH resources for IAB node 3 via explicit signaling (e.g., DCI communication, downlink MAC-CE communication, and/or the like) or IAB node 3 may automatically deactivate the second set of PDCCH resources for IAB node 3.

In some aspects, IAB node 2 may automatically deactivate the first set of adaptive PDCCH resources and/or the second set of adaptive PDCCH resources based at least in part on the one or more activation and/or deactivation parameters indicated in the communication that activated the first set of adaptive PDCCH resources and/or the second set of adaptive PDCCH resources (e.g., based at least in part on expiration of the activation period specified in the communication), based at least in part on being hard-coded, semi-statically configured, and/or the like with information (e.g., a specification, a table, and/or the like) identifying one or more parameters for deactivating the first set of adaptive PDCCH resources and/or the second set of adaptive PDCCH resources (e.g., based at least in part on receiving a threshold quantity of URLLC communications), and/or the like.

As further shown in FIG. 7, and by reference number 714, the MT of IAB node 2 may return to monitoring only the first set of non-adaptive PDCCH resources for PDCCH communications transmitted from the parent node of IAB node 2 (e.g., IAB node 1) based at least in part on the first set of adaptive PDCCH resources being deactivated. Additionally, the DU of IAB node 2 may return to using only the second set of non-adaptive PDCCH resources for transmitting PDCCH communications to IAB node 3 and/or other child nodes based at least in part on the second set of adaptive PDCCH resources being deactivated.

In this way, the IAB donor may configure a plurality of sets of PDCCH resources, wherein one or more sets of PDCCH resources may be dynamically activated for various types of traffic, such as URLLC traffic. The IAB node may use a first set of non-adaptive PDCCH resources and a first set of adaptive PDCCH resources to communicate with a parent node when the first set of adaptive PDCCH resources is activated, and may use the first set of non-adaptive PDCCH resources to communicate with the parent node when the first set of adaptive PDCCH resources is deactivated. The IAB node may also use a second set of non-adaptive PDCCH resources and a second set of adaptive PDCCH resources to communicate with a child node when the second set of adaptive PDCCH resources is activated, and may use the second set of non-adaptive PDCCH resources to communicate with the child node when the second set of adaptive PDCCH resources is deactivated.

This permits PDCCH resources, such as PDCCH resources that are used for mini-slot based scheduling, to be flexibly utilized for traffic associated with various types of 5G/NR services. For example, an IAB donor or IAB node may activate sets of adaptive PDCCH resources to facilitate URLLC traffic to be transmitted through the IAB network with low latency while using sets of non-adaptive PDCCH resources for scheduling eMBB traffic through the IAB network.

As indicated above, FIG. 7 is provided as one or more examples. Other examples may differ from what is described with respect to FIG. 7.

Figure 8A:
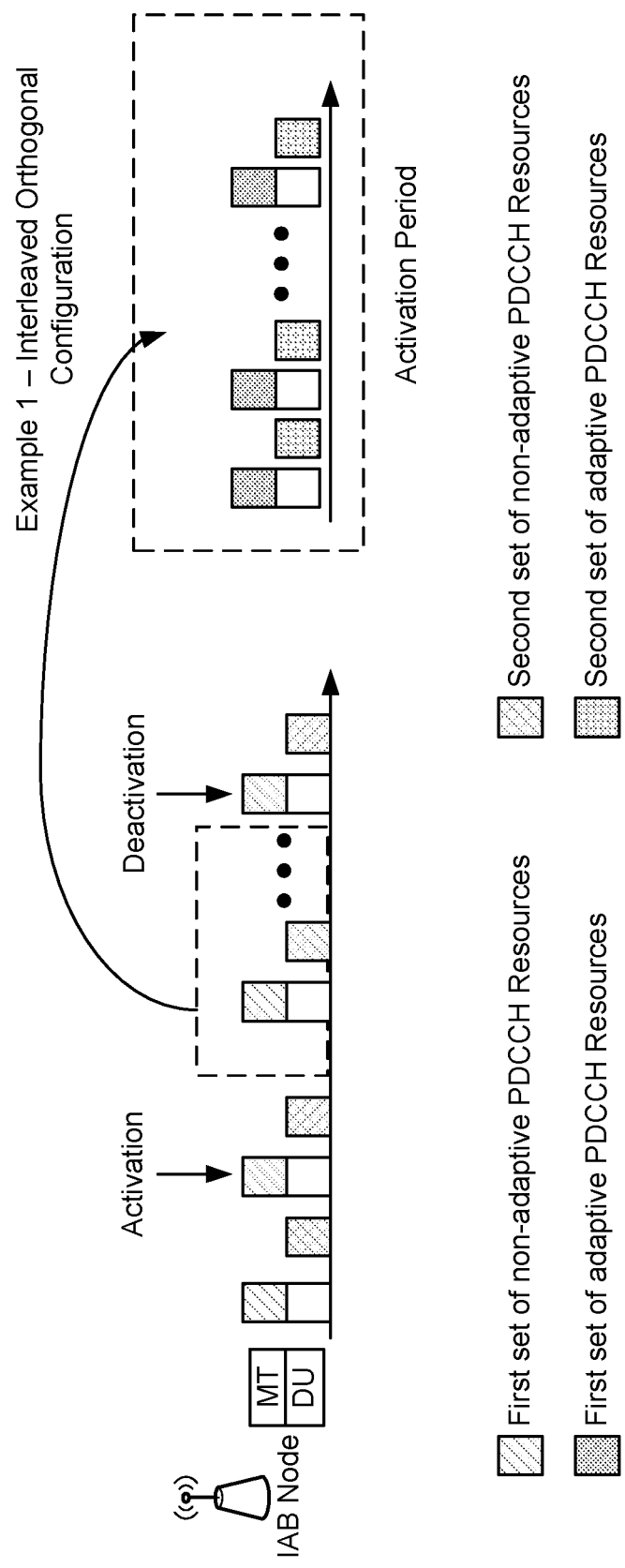
Figure 8B:
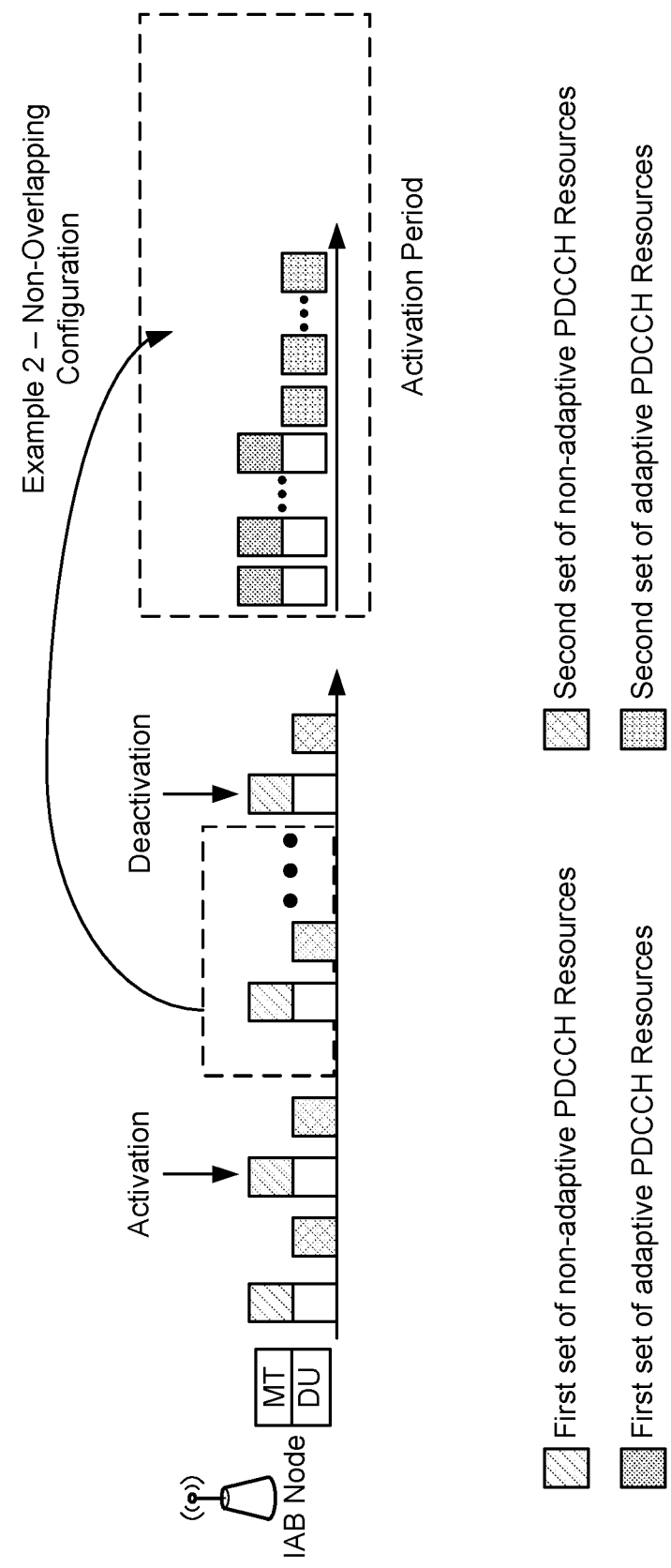
Figure 8C:
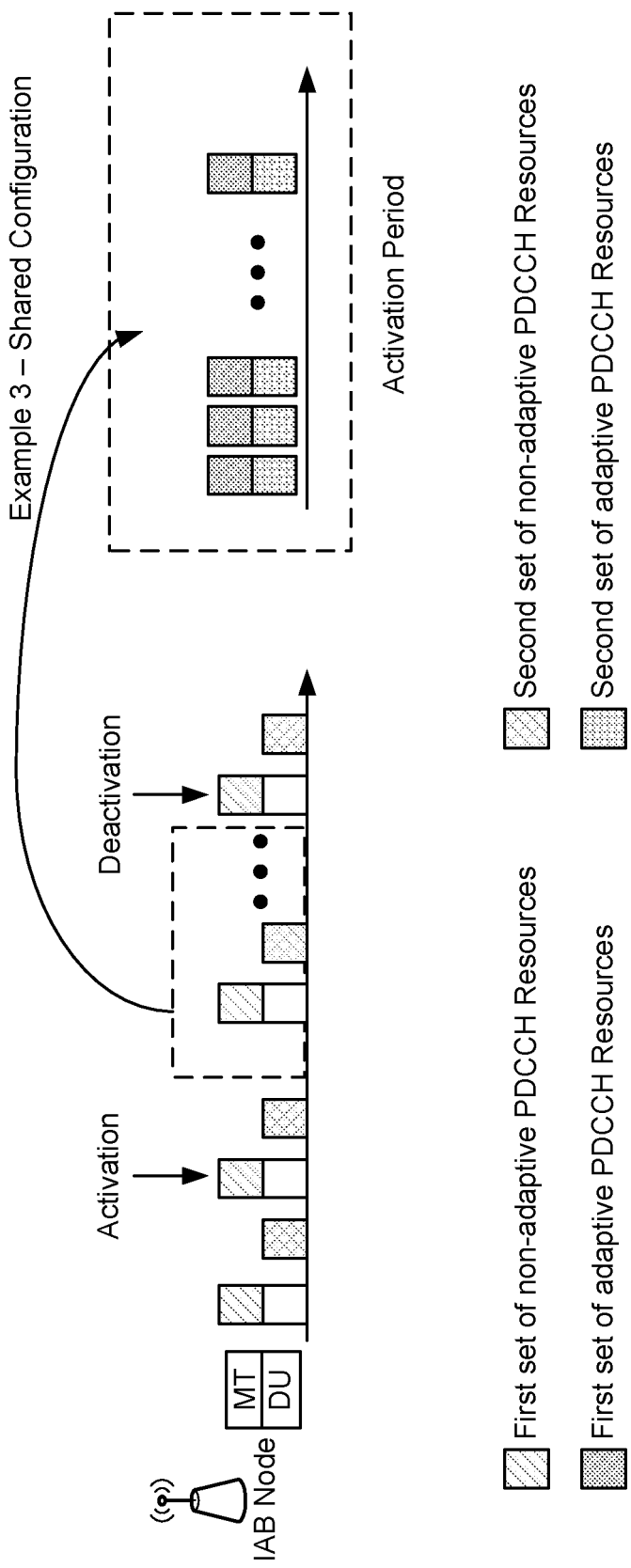

FIGS. 8A-8C are diagrams illustrating examples 800 of adaptive PDCCH monitoring, in accordance with various aspects of the present disclosure. In some aspects, examples 800 may illustrate various example configurations of the activation periods described above in connection with FIG. 7.

As shown in FIGS. 8A-8C, prior to the activation period, the MT of the IAB node may monitor a first set of non-adaptive PDCCH resources for PDCCH communications that are transmitted from a parent node (e.g., an IAB donor, another IAB node, and/or the like), and may use a second set of non-adaptive PDCCH resources to transmit PDCCH communications (e.g., DCI communications) to a child node (e.g., another IAB node, a UE, and/or the like).

The IAB node may receive one or more communications that activate a first set of adaptive PDCCH resources and a second set of adaptive PDCCH resources, and may monitor the first set of non-adaptive PDCCH resources and the first set of adaptive PDCCH resources for PDCCH communications transmitted from the parent node during the activation period. Moreover, the IAB node may transmit, to the child node, one or more communications that activate the second set of adaptive PDCCH resources for the child node, and may use the second set of non-adaptive PDCCH resources and the second set of adaptive PDCCH resources to schedule and transmit PDCCH communications to the child node during the activation period.

Once the first set of adaptive PDCCH resources and the second set of adaptive PDCCH resources are deactivated (e.g., based on one or more parameters indicated in the one or more communications, based on receiving one or more communications that deactivate the first set of adaptive PDCCH resources and the second set of adaptive PDCCH resources, and/or the like), the IAB node may return to monitoring the first set of non-adaptive PDCCH resources for PDCCH communications that are transmitted from the parent node and using the second set of non-adaptive PDCCH resources to schedule and transmit PDCCH communications to the child node.

FIG. 8A illustrates an example (e.g., Example 1) of an interleaved orthogonal configuration for the activation period. As shown in FIG. 8A, the first set of adaptive PDCCH resources and the second set of adaptive PDCCH resources may be configured such that the first set of adaptive PDCCH resources and the second set of adaptive PDCCH resources are interleaved in the time domain and in an orthogonal manner.

FIG. 8B illustrates an example (e.g., Example 2) of a non-overlapping configuration for the activation period. As shown in FIG. 8B, the first set of adaptive PDCCH resources and the second set of adaptive PDCCH resources may be configured such that the first set of adaptive PDCCH resources and the second set of adaptive PDCCH resources do not overlap in the time domain. In this case, the first set of adaptive PDCCH resources may be located in a first time-frequency region in the activation period, the second set of adaptive PDCCH resources may be located in a second time-frequency region in the activation period, and the first time-frequency region and the second time-frequency region may be non-overlapping time-frequency regions in the activation period.

FIG. 8C illustrates an example (e.g., Example 3) of a shared configuration for the activation period. As shown in FIG. 8C, the first set of adaptive PDCCH resources and the second set of adaptive PDCCH resources may be configured such that the first set of adaptive PDCCH resources and the second set of adaptive PDCCH resources share time domain and/or frequency domain resources in the activation period. In this case, the shared time domain and/or frequency domain resources may be flexible time domain and/or frequency domain resources in that the IAB node may flexibly use the time domain and/or frequency domain resources to receive PDCCH communications from the parent node or transmit PDCCH communications to the child node.

As indicated above, FIGS. 8A-8C are provided as one or more examples. Other examples may differ from what is described with respect to FIGS. 8A-8C.

FIG. 9 is a diagram illustrating an example process 900 performed, for example, by a wireless communication device, in accordance with various aspects of the present disclosure. Example process 900 is an example where a wireless communication device (e.g., a BS 110, a UE 120, an IAB node, an MT device, a DU device, and/or the like) performs operations associated with adaptive PDCCH monitoring.

As shown in FIG. 9, in some aspects, process 900 may include receiving an indication of a first set of non-adaptive PDCCH resources for monitoring a first set of adaptive PDCCH resources for monitoring (e.g., that may be used for monitoring after being activated), a second set of non-adaptive PDCCH resources for transmitting one or more DCI communications to a second wireless communication device and a second set of adaptive PDCCH resources for transmitting the one or more DCI communications (e.g., that may be used for transmitting after being activated) (block 910). For example, the wireless communication device (e.g., using transmit processor 220, receive processor 238, controller/processor 240, memory 242, receive processor 258, transmit processor 264, controller/processor 280, memory 282, and/or the like) may receive an indication of a first set of non-adaptive PDCCH resources for monitoring, a first set of adaptive PDCCH resources for monitoring (e.g., that may be used for monitoring after being activated), a second set of non-adaptive PDCCH resources for transmitting one or more DCI communications to a second wireless communication device and a second set of adaptive PDCCH resources for transmitting the one or more DCI communications (e.g., that may be used for transmitting after being activated), as described above.

As further shown in FIG. 9, in some aspects, process 900 may include monitoring, based at least in part on whether the first set of adaptive PDCCH resources is activated, the first set of non-adaptive PDCCH resources, or the first set of non-adaptive PDCCH resources and the first set of adaptive PDCCH resources (block 920). For example, the wireless communication device (e.g., using transmit processor 220, receive processor 238, controller/processor 240, memory 242, receive processor 258, transmit processor 264, controller/processor 280, memory 282, and/or the like) may monitor, based at least in part on whether the first set of adaptive PDCCH resources is activated, the first set of non-adaptive PDCCH resources, or the first set of non-adaptive PDCCH resources and the first set of adaptive PDCCH resources, as described above.

As further shown in FIG. 9, in some aspects, process 900 may include transmitting, based at least in part on whether the second set of adaptive PDCCH resources is activated, the one or more DCI communications to the second wireless communication device using the second set of non-adaptive PDCCH resources, or the second set of non-adaptive PDCCH resources and the second set of adaptive PDCCH resources (block 930). For example, the wireless communication device (e.g., using transmit processor 220, receive processor 238, controller/processor 240, memory 242, receive processor 258, transmit processor 264, controller/processor 280, memory 282, and/or the like) may transmit, based at least in part on whether the second set of adaptive PDCCH resources is activated, the one or more DCI communications to the second wireless communication device using the second set of non-adaptive PDCCH resources, or the second set of non-adaptive PDCCH resources and the second set of adaptive PDCCH resources, as described above.

Process 900 may include additional aspects, such as any single aspect or any combination of aspects described below and/or in connection with one or more other processes described elsewhere herein.

In a first aspect, process 900 further comprises receiving, over a non-adaptive PDCCH resource, a communication that activates the first set of adaptive PDCCH resources and the second set of adaptive PDCCH resources, monitoring the first set of non-adaptive PDCCH resources or the first set of non-adaptive PDCCH resources and the first set of adaptive PDCCH resources comprises monitoring the first set of non-adaptive PDCCH resources and the first set of adaptive PDCCH resources based at least in part on receiving the communication that activates the first set of adaptive PDCCH resources, and transmitting the one or more DCI communications using the second set of non-adaptive PDCCH resources or the second set of non-adaptive PDCCH resources and the second set of adaptive PDCCH resources comprises transmitting the one or more DCI communications using the second set of non-adaptive PDCCH resources and the second set of adaptive PDCCH resources based at least in part on receiving the communication that activates the second set of adaptive PDCCH resources.

In a second aspect, alone or in combination with the first aspect, process 900 further comprises adjusting, based at least in part on the first set of adaptive PDCCH resources and the second set of adaptive PDCCH resources being activated, at least one of a blind decoding configuration for the first set of non-adaptive PDCCH resources and the first set of adaptive PDCCH resources, a CCE configuration for the first set of non-adaptive PDCCH resources and the first set of adaptive PDCCH resources, or a CCE configuration for the second set of non-adaptive PDCCH resources and the second set of adaptive PDCCH resources.

In a third aspect, alone or in combination with one or more of the first and second aspects, process 900 further comprises determining, based at least in part on one or more parameters indicated in the communication that activates the first set of adaptive PDCCH resources and the second set of PDCCH resources, that the first set of adaptive PDCCH resources and the second set of adaptive PDCCH resources have been subsequently deactivated, monitoring the first set of non-adaptive PDCCH resources or the first set of non-adaptive PDCCH resources and the first set of adaptive PDCCH resources comprises monitoring the first set of non-adaptive PDCCH resources based at least in part on determining that the first set of adaptive PDCCH resources has been subsequently deactivated, and transmitting the one or more DCI communications using the second set of non-adaptive PDCCH resources or the second set of non-adaptive PDCCH resources and the second set of adaptive PDCCH resources comprises transmitting the one or more DCI communications using the second set of non-adaptive PDCCH resources based at least in part on determining that the second set of adaptive PDCCH resources has been subsequently deactivated.

In a fourth aspect, alone or in combination with one or more of the first through third aspects, the one or more parameters comprise at least one of a parameter indicating an activation period during which the first set of adaptive PDCCH resources and the second set of adaptive PDCCH resources are activated, a parameter indicating that the first set of adaptive PDCCH resources is to be deactivated based at least in part on expiration of the activation period, or a parameter indicating that the first set of adaptive PDCCH resources is to be deactivated after reception of a particular quantity of communications using the first set of adaptive PDCCH resources. In a fifth aspect, alone or in combination with one or more of the first through fourth aspects, the communication that activates the first set of adaptive PDCCH resources and the second set of adaptive PDCCH resources comprises a DCI communication or a downlink MAC-CE.

In a sixth aspect, alone or in combination with one or more of the first through fifth aspects, the communication that activates the first set of adaptive PDCCH resources and the second set of adaptive PDCCH resources comprises a DCI activation, the DCI activation being associated with a DCI format that is associated with adaptive PDCCH monitoring. In a seventh aspect, alone or in combination with one or more of the first through sixth aspects, the communication that activates the first set of adaptive PDCCH resources and the second set of adaptive PDCCH resources comprises a DCI activation, the DCI activation including a field that indicates that the first set of adaptive PDCCH resources and the second set of adaptive PDCCH resources are to be activated.

In an eighth aspect, alone or in combination with one or more of the first through seventh aspects, the communication that activates the first set of adaptive PDCCH resources and the second set of adaptive PDCCH resources comprises an indication of one or more parameters for activating the first set of adaptive PDCCH resources and the second set of adaptive PDCCH resources, and the one or more parameters comprise at least one of a parameter indicating an activation period during which the first set of adaptive PDCCH resources and the second set of adaptive PDCCH resources are to be activated, a parameter indicating whether all or a subset of the first set of adaptive PDCCH resources and the second set of adaptive PDCCH resources are to be activated during the activation period, a parameter indicating a PDCCH blind decoding configuration for the activation period, a parameter indicating a CCE configuration for the activation period, or a parameter that indicates a time at which the activation period is to commence.

In a ninth aspect, alone or in combination with one or more of the first through eighth aspects, process 900 further comprises receiving a communication that deactivates the first set of adaptive PDCCH resources and the second set of adaptive PDCCH resources, monitoring the first set of non-adaptive PDCCH resources or the first set of non-adaptive PDCCH resources and the first set of adaptive PDCCH resources comprises monitoring the first set of non-adaptive PDCCH resources based at least in part on receiving the communication that deactivates the first set of adaptive PDCCH resources and the second set of adaptive PDCCH resources, and transmitting the one or more DCI communications using the second set of non-adaptive PDCCH resources or the second set of non-adaptive PDCCH resources and the second set of adaptive PDCCH resources comprises transmitting the one or more DCI communications using the second set of non-adaptive PDCCH resources based at least in part on receiving the communication that deactivates the first set of adaptive PDCCH resources and the second set of adaptive PDCCH resources.

In a tenth aspect, alone or in combination with one or more of the first through ninth aspects, a starting time, of an activation period during which the first set of adaptive PDCCH resources and the second set of adaptive PDCCH resources are activated, is based at least in part on at least one of: a value specified in a table or specification, a semi-static configured variable that is based at least in part on a quantity of IAB nodes between the wireless communication device and an IAB donor, or a value specified in a communication that activates the first set of adaptive PDCCH resources and the second set of adaptive PDCCH resources. In an eleventh aspect, alone or in combination with one or more of the first through tenth aspects, the wireless communication device comprises an IAB node, the first set of non-adaptive PDCCH resources and the first set of adaptive PDCCH resources are associated with an MT function of the IAB node, and the second set of non-adaptive PDCCH resources and the second set of adaptive PDCCH resources are associated with a DU function of the IAB node.

In a twelfth aspect, alone or in combination with one or more of the first through eleventh aspects, process 900 further comprises receiving, over a first non-adaptive PDCCH resource, a first communication that activates the first set of adaptive PDCCH resources and the second set of adaptive PDCCH resources, and transmitting the one or more DCI communications to the second wireless communication device using the second set of non-adaptive PDCCH resources or the second set of non-adaptive PDCCH resources and the second set of adaptive PDCCH resources comprises transmitting the one or more DCI communications to the second wireless communication device using the second set of non-adaptive PDCCH resources and the second set of adaptive PDCCH resources based at least in part on receiving the first communication. In a thirteenth aspect, alone or in combination with one or more of the first through twelfth aspects, process 900 further comprises transmitting, over a second non-adaptive PDCCH resource and to the second communication device, a second communication that activates the first set of adaptive PDCCH resources and the second set of adaptive PDCCH resources for the second communication device.

In a fourteenth aspect, alone or in combination with one or more of the first through thirteenth aspects, at least one of the first communication or the second communication comprises a DCI communication or a downlink MAC-CE. In a fifteenth aspect, alone or in combination with one or more of the first through fourteenth aspects, the second communication comprises an indication that the first set of adaptive PDCCH resources and the second set of adaptive PDCCH resources have been activated.

In a sixteenth aspect, alone or in combination with one or more of the first through fifteenth aspects, the first communication comprises an indication of one or more parameters for activating the first set of adaptive PDCCH resources and the second set of adaptive PDCCH resources, the one or more parameters comprise at least one of a parameter indicating an activation period during which the first set of adaptive PDCCH resources and the second set of adaptive PDCCH resources is activated, a parameter indicating whether all or a subset of the first set of adaptive PDCCH resources and the second set of adaptive PDCCH resources is to be activated during the activation period, a parameter indicating a PDCCH blind decoding configuration for the activation period, a parameter indicating a CCE configuration for the activation period, a parameter indicating whether the first wireless communication device is to transmit, to the second wireless communication device, the second communication, a parameter indicating an identifier associated with the second wireless communication device, or a parameter that indicates a time at which the activation period is to commence.

In a seventeenth aspect, alone or in combination with one or more of the first through sixteenth aspects, the second communication comprises an indication of one or more parameters for deactivating the first set of adaptive PDCCH resources and the second set of adaptive PDCCH resources, the one or more parameters comprising at least one of a parameter indicating an activation period during which the first set of adaptive PDCCH resources and the second set of adaptive PDCCH resources are activated, a parameter indicating that the first set of adaptive PDCCH resources and the second set of adaptive PDCCH resources are to be deactivated based at least in part on expiration of the activation period, or a parameter indicating that the first set of adaptive PDCCH resources and the second set of adaptive PDCCH resources are to be deactivated after reception of a particular quantity of communications using the second set of adaptive PDCCH resources.

In an eighteenth aspect, alone or in combination with one or more of the first through seventeenth aspects, the second communication comprises a DCI activation, the DCI activation being associated with a DCI format that is associated with adaptive PDCCH monitoring. In a nineteenth aspect, alone or in combination with one or more of the first through eighteenth aspects, the second communication comprises a DCI activation, the DCI activation including a field that indicates that the first set of adaptive PDCCH resources and the second set of adaptive PDCCH resources are to be activated.

In a twentieth aspect, alone or in combination with one or more of the first through nineteenth aspects, process 900 further comprises receiving a first communication that deactivates the first set of adaptive PDCCH resources and the second set of adaptive PDCCH resources, and transmitting the one or more DCI communications to the second wireless communication device using the second set of non-adaptive PDCCH resources or the second set of non-adaptive PDCCH resources and the second set of adaptive PDCCH resources comprises transmitting the one or more DCI communications to the other wireless communication device using the second set of non-adaptive PDCCH resources based at least in part on receiving the first communication. In a twenty-first aspect, alone or in combination with one or more of the first through twentieth aspects, process 900 further comprises transmitting, to the second wireless communication device based at least in part on receiving the first communication, a second communication that deactivates the second set of adaptive PDCCH resources.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
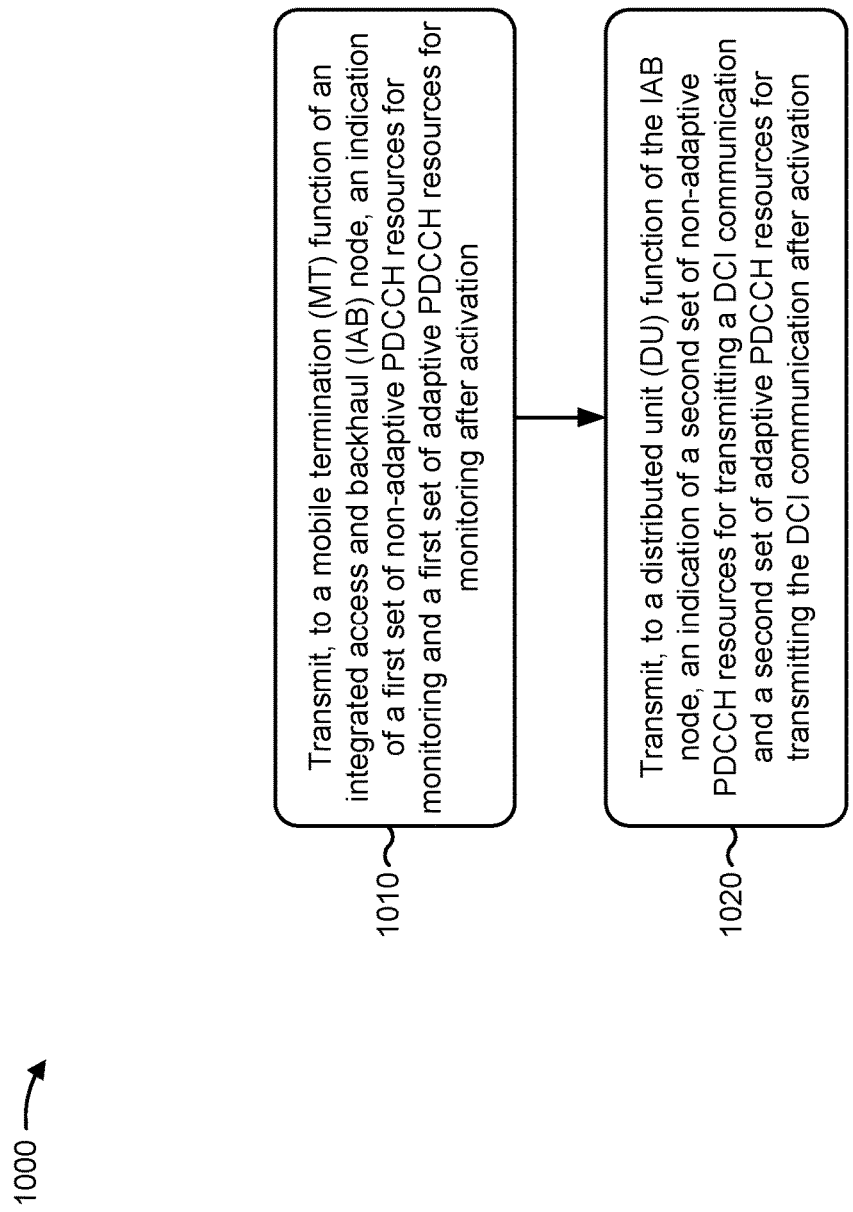

FIG. 10 is a diagram illustrating an example process 1000 performed, for example, by a wireless communication device, in accordance with various aspects of the present disclosure. Example process 1000 is an example where a wireless communication device (e.g., a BS 110, a UE 120, an IAB donor, a CU device, and/or the like) performs operations associated with adaptive PDCCH monitoring.

As shown in FIG. 10, in some aspects, process 1000 may include transmitting, to an MT function of an IAB node, an indication of a first set of non-adaptive PDCCH resources for monitoring and a first set of adaptive PDCCH resources for monitoring (e.g., that may be used for monitoring after being activated) (block 1010). For example, the wireless communication device (e.g., using transmit processor 220, receive processor 238, controller/processor 240, memory 242, receive processor 258, transmit processor 264, controller/processor 280, memory 282, and/or the like) may transmit, to an MT function of an IAB node, an indication of a first set of non-adaptive PDCCH resources for monitoring and a first set of adaptive PDCCH resources for monitoring (e.g., that may be used for monitoring after being activated), as described above.

As further shown in FIG. 10, in some aspects, process 1000 may include transmitting, to a DU function of the IAB node, an indication of a second set of non-adaptive PDCCH resources for transmitting a DCI communication and a second set of adaptive PDCCH resources for transmitting the DCI communication (e.g., that may be used for transmitting after being activated) (block 1020). For example, the wireless communication device (e.g., using transmit processor 220, receive processor 238, controller/processor 240, memory 242, receive processor 258, transmit processor 264, controller/processor 280, memory 282, and/or the like) may transmit, to a DU function of the IAB node, an indication of a second set of non-adaptive PDCCH resources for transmitting a DCI communication and a second set of adaptive PDCCH resources for transmitting the DCI communication (e.g., that may be used for transmitting after being activated), as described above.

Process 1000 may include additional aspects, such as any single aspect or any combination of aspects described below and/or in connection with one or more other processes described elsewhere herein.

In a first aspect, the first set of non-adaptive PDCCH resources and the second set of non-adaptive PDCCH resources are non-overlapping resources. In a second aspect, alone or in combination with the first aspect, the first set of adaptive PDCCH resources is interleaved with the second set of adaptive PDCCH resources. In a third aspect, alone or in combination with one or more of the first and second aspects, the first set of adaptive PDCCH resources is located in a first time-frequency region, the second set of adaptive PDCCH resources is located in a second time-frequency region, and the first time-frequency region and the second time-frequency region are non-overlapping time-frequency regions.

In a fourth aspect, alone or in combination with one or more of the first through third aspects, the first set of adaptive PDCCH resources and the second set of adaptive PDCCH resources share the same PDCCH resources. In a fifth aspect, alone or in combination with one or more of the first through fourth aspects, process 1000 further comprises receiving an indication that another wireless communication device is preparing to transmit URLLC traffic along a route that includes the IAB node, and transmitting, to the MT function of the IAB node and based at least in part on receiving the indication that the other wireless communication device is preparing to transmit the URLLC traffic, a communication that activates the first set of adaptive PDCCH resources and the second set of adaptive PDCCH resources.

In a sixth aspect, alone or in combination with one or more of the first through fifth aspects, process 1000 further comprises receiving a first URLLC communication of a plurality of URLLC communications, and transmitting, to the MT function of the IAB node and based at least in part on receiving the first URLLC communication, a communication that activates the first set of adaptive PDCCH resources and the second set of adaptive PDCCH resources. In a seventh aspect, alone or in combination with one or more of the first through sixth aspects, the wireless communication device comprises an IAB donor or a CU device.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like. Thresholds may be static and/or dynamic. During communication scenarios, thresholds may be static so that comparisons thereto can occur. Comparisons to known threshold values can determine relative value. Dynamic thresholds enable movement of threshold values to accommodate changing communication scenarios (e.g., dynamic channel conditions, modified communication network operations, updated communication components, and/or the like). Thresholds may be associated with the various beams, channels, and/or signals discussed herein (e.g., reference signals, signal noise/interference ratios, power levels, and/or the like).

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first wireless communication device, comprising:
   receiving an indication of:
      a first set of non-adaptive physical downlink control channel (PDCCH) resources for monitoring,
      a first set of adaptive PDCCH resources for monitoring
      a second set of non-adaptive PDCCH resources for transmitting one or more downlink control information (DCI) communications to a second wireless communication device, and
      a second set of adaptive PDCCH resources for transmitting the one or more DCI communications;
   monitoring, based at least in part on whether the first set of adaptive PDCCH resources is activated:
      the first set of non-adaptive PDCCH resources, or
      the first set of non-adaptive PDCCH resources and the first set of adaptive PDCCH resources; and
   transmitting, based at least in part on whether the second set of adaptive PDCCH resources is activated, the one or more DCI communications to the second wireless communication device using:
      the second set of non-adaptive PDCCH resources, or
      the second set of non-adaptive PDCCH resources and the second set of adaptive PDCCH resources.

2. The method of claim 1, further comprising:
   receiving, over a non-adaptive PDCCH resource, a communication that activates the first set of adaptive PDCCH resources and the second set of adaptive PDCCH resources;
   wherein monitoring the first set of non-adaptive PDCCH resources or the first set of non-adaptive PDCCH resources and the first set of adaptive PDCCH resources comprises:
      monitoring the first set of non-adaptive PDCCH resources and the first set of adaptive PDCCH resources based at least in part on receiving the communication that activates the first set of adaptive PDCCH resources; and
   wherein transmitting the one or more DCI communications using the second set of non-adaptive PDCCH resources or the second set of non-adaptive PDCCH resources and the second set of adaptive PDCCH resources comprises:
      transmitting the one or more DCI communications using the second set of non-adaptive PDCCH resources and the second set of adaptive PDCCH resources based at least in part on receiving the communication that activates the second set of adaptive PDCCH resources.

3. The method of claim 2, further comprising:
   adjusting, based at least in part on the first set of adaptive PDCCH resources and the second set of adaptive PDCCH resources being activated, at least one of:
      a blind decoding configuration for the first set of non-adaptive PDCCH resources and the first set of adaptive PDCCH resources,
      a control channel element (CCE) configuration for the first set of non-adaptive PDCCH resources and the first set of adaptive PDCCH resources, or a CCE configuration for the second set of non-adaptive PDCCH resources and the second set of adaptive PDCCH resources.

4. The method of claim 2, further comprising:
determining, based at least in part on one or more parameters indicated in the communication that activates the first set of adaptive PDCCH resources and the second set of adaptive PDCCH resources, that the first set of adaptive PDCCH resources and the second set of adaptive PDCCH resources have been subsequently deactivated;
wherein monitoring the first set of non-adaptive PDCCH resources or the first set of non-adaptive PDCCH resources and the first set of adaptive PDCCH resources comprises:
monitoring the first set of non-adaptive PDCCH resources based at least in part on determining that the first set of adaptive PDCCH resources has been subsequently deactivated; and
wherein transmitting the one or more DCI communications using the second set of non-adaptive PDCCH resources or the second set of non-adaptive PDCCH resources and the second set of adaptive PDCCH resources comprises:
transmitting the one or more DCI communications using the second set of non-adaptive PDCCH resources based at least in part on determining that the second set of adaptive PDCCH resources has been subsequently deactivated.

5. The method of claim 4, wherein the one or more parameters comprise at least one of:
a parameter indicating an activation period during which the first set of adaptive PDCCH resources and the second set of adaptive PDCCH resources are activated,
a parameter indicating that the first set of adaptive PDCCH resources is to be deactivated based at least in part on expiration of the activation period, or
a parameter indicating that the first set of adaptive PDCCH resources is to be deactivated after reception of a particular quantity of communications using the first set of adaptive PDCCH resources.

6. The method of claim 2, wherein the communication that activates the first set of adaptive PDCCH resources and the second set of adaptive PDCCH resources comprises:
a DCI activation,
wherein the DCI activation is associated with a DCI format that is associated with adaptive PDCCH monitoring.

7. The method of claim 2, wherein the communication that activates the first set of adaptive PDCCH resources and the second set of adaptive PDCCH resources comprises:
a DCI activation,
wherein the DCI activation includes a field that indicates that the first set of adaptive PDCCH resources and the second set of adaptive PDCCH resources are to be activated.

8. The method of claim 2, wherein the communication that activates the first set of adaptive PDCCH resources and the second set of adaptive PDCCH resources comprises:
an indication of one or more parameters for activating the first set of adaptive PDCCH resources and the second set of adaptive PDCCH resources,
wherein the one or more parameters comprise at least one of:

a parameter indicating an activation period during which the first set of adaptive PDCCH resources and the second set of adaptive PDCCH resources are to be activated,
a parameter indicating whether all or a subset of the first set of adaptive PDCCH resources and the second set of adaptive PDCCH resources are to be activated during the activation period,
a parameter indicating a PDCCH blind decoding configuration for the activation period,
a parameter indicating a control channel element (CCE) configuration for the activation period, or
a parameter that indicates a time at which the activation period is to commence.

9. The method of claim 1, further comprising:
receiving a communication that deactivates the first set of adaptive PDCCH resources and the second set of adaptive PDCCH resources;
wherein monitoring the first set of non-adaptive PDCCH resources or the first set of non-adaptive PDCCH resources and the first set of adaptive PDCCH resources comprises:
monitoring the first set of non-adaptive PDCCH resources based at least in part on receiving the communication that deactivates the first set of adaptive PDCCH resources and the second set of adaptive PDCCH resources; and
wherein transmitting the one or more DCI communications using the second set of non-adaptive PDCCH resources or the second set of non-adaptive PDCCH resources and the second set of adaptive PDCCH resources comprises:
transmitting the one or more DCI communications using the second set of non-adaptive PDCCH resources based at least in part on receiving the communication that deactivates the first set of adaptive PDCCH resources and the second set of adaptive PDCCH resources.

10. The method of claim 1, wherein a starting time, of an activation period during which the first set of adaptive PDCCH resources and the second set of adaptive PDCCH resources are activated, is based at least in part on at least one of:
a value specified in a table or specification,
a semi-static configured variable that is based at least in part on a quantity of integrated access and backhaul (IAB) nodes between the wireless communication device and an IAB donor, or
a value specified in a communication that activates the first set of adaptive PDCCH resources and the second set of adaptive PDCCH resources.

11. The method of claim 1, wherein the wireless communication device comprises:
an integrated access and backhaul (IAB) node,
wherein the first set of non-adaptive PDCCH resources and the first set of adaptive PDCCH resources are associated with a mobile termination (MT) function of the IAB node, and
wherein the second set of non-adaptive PDCCH resources and the second set of adaptive PDCCH resources are associated with a distributed unit (DU) function of the IAB node.

12. The method of claim 1, further comprising:
receiving, over a first non-adaptive PDCCH resource, a first communication that activates the first set of adaptive PDCCH resources and the second set of adaptive PDCCH resources; and wherein transmitting the one or more DCI communications to the second wireless communication device using the second set of non-adaptive PDCCH resources or the second set of non-adaptive PDCCH resources and the second set of adaptive PDCCH resources comprises:
transmitting the one or more DCI communications to the second wireless communication device using the second set of non-adaptive PDCCH resources and the second set of adaptive PDCCH resources based at least in part on receiving the first communication.

13. The method of claim 12, further comprising:
transmitting, over a second non-adaptive PDCCH resource and to the second communication device, a second communication that activates the first set of adaptive PDCCH resources and second set of adaptive PDCCH resources for the second communication device.

14. The method of claim 13, wherein the second communication comprises:
an indication that the first set of adaptive PDCCH resources and the second set of adaptive PDCCH resources have been activated.

15. The method of claim 13, wherein the first communication comprises:
an indication of one or more parameters for activating the first set of adaptive PDCCH resources and the second set of adaptive PDCCH resources,
wherein the one or more parameters comprise at least one of:
a parameter indicating an activation period during which the first set of adaptive PDCCH resources and the second set of adaptive PDCCH resources is activated,
a parameter indicating whether all or a subset of the first set of adaptive PDCCH resources and the second set of adaptive PDCCH resources is to be activated during the activation period,
a parameter indicating a PDCCH blind decoding configuration for the activation period,
a parameter indicating a control channel element (CCE) configuration for the activation period,
a parameter indicating whether the first wireless communication device is to transmit, to the second wireless communication device, the second communication,
a parameter indicating an identifier associated with the second wireless communication device, or
a parameter that indicates a time at which the activation period is to commence.

16. The method of claim 13, wherein the second communication comprises:
an indication of one or more parameters for deactivating the first set of adaptive PDCCH resources and the second set of adaptive PDCCH resources,
wherein the one or more parameters comprise at least one of:
a parameter indicating an activation period during which the first set of adaptive PDCCH resources and the second set of adaptive PDCCH resources is activated,
a parameter indicating that the first set of adaptive PDCCH resources and the second set of adaptive PDCCH resources are to be deactivated based at least in part on expiration of the activation period, or a parameter indicating that the first set of adaptive PDCCH resources and the second set of adaptive PDCCH resources are to be deactivated after reception of a particular quantity of communications using the second set of adaptive PDCCH resources.

17. The method of claim 13, wherein the second communication comprises:
a DCI activation,
wherein the DCI activation is associated with a DCI format that is associated with adaptive PDCCH monitoring.

18. The method of claim 13, wherein the second communication comprises:
a DCI activation,
wherein the DCI activation includes a field that indicates that the first set of adaptive PDCCH resources and the second set of adaptive PDCCH resources are to be activated.

19. The method of claim 1, further comprising:
receiving a first communication that deactivates the first set of adaptive PDCCH resources and the second set of adaptive PDCCH resources; and
wherein transmitting the one or more DCI communications to the second wireless communication device using the second set of non-adaptive PDCCH resources or the second set of non-adaptive PDCCH resources and the second set of adaptive PDCCH resources comprises:
transmitting the one or more DCI communications to the other wireless communication device using the second set of non-adaptive PDCCH resources based at least in part on receiving the first communication.

20. A method of wireless communication performed by a wireless communication device, comprising:
transmitting, to a mobile termination (MT) function of an integrated access and backhaul (IAB) node, an indication of:
a first set of non-adaptive physical downlink control channel (PDCCH) resources for monitoring, and
a first set of adaptive PDCCH resources for monitoring after activation; and
transmitting, to a distributed unit (DU) function of the IAB node, an indication of:
a second set of non-adaptive PDCCH resources for transmitting a downlink control information (DCI) communication, and
a second set of adaptive PDCCH resources for transmitting the DCI communication after activation.

21. The method of claim 20, wherein the first set of non-adaptive PDCCH resources and the second set of non-adaptive PDCCH resources are non-overlapping resources.

22. The method of claim 20, wherein the first set of adaptive PDCCH resources is interleaved with the second set of adaptive PDCCH resources.

23. The method of claim 20, wherein the first set of adaptive PDCCH resources is located in a first time-frequency region;
wherein the second set of adaptive PDCCH resources is located in a second time-frequency region; and
wherein the first time-frequency region and the second time-frequency region are non-overlapping time-frequency regions.

24. The method of claim 20, wherein the first set of adaptive PDCCH resources and the second set of adaptive PDCCH resources share the same PDCCH resources.

25. The method of claim 20, further comprising:
receiving an indication that another wireless communication device is preparing to transmit ultra reliable low latency communication (URLLC) traffic along a route that includes the IAB node; and
transmitting, to the MT function of the IAB node and based at least in part on receiving the indication that the other wireless communication device is preparing to transmit the URLLC traffic, a communication that activates the first set of adaptive PDCCH resources and the second set of adaptive PDCCH resources.

26. The method of claim 20, further comprising:
receiving a first ultra reliable low latency communication (URLLC) communication of a plurality of URLLC communications; and
transmitting, to the MT function of the IAB node and based at least in part on receiving the first URLLC communication, a communication that activates the first set of adaptive PDCCH resources and the second set of adaptive PDCCH resources.

27. A first wireless communication device for wireless communication, comprising:
a memory; and
one or more processors operatively coupled to the memory, the memory and the one or more processors configured to:
receive an indication of:
a first set of non-adaptive physical downlink control channel (PDCCH) resources for monitoring,
a first set of adaptive PDCCH resources for monitoring after activation,
a second set of non-adaptive PDCCH resources for transmitting one or more downlink control information (DCI) communications to a second wireless communication device, and
a second set of adaptive PDCCH resources for transmitting the one or more DCI communications;
monitor, based at least in part on whether the first set of adaptive PDCCH resources is activated:
the first set of non-adaptive PDCCH resources, or
the first set of non-adaptive PDCCH resources and the first set of adaptive PDCCH resources; and
transmit, based at least in part on whether the second set of adaptive PDCCH resources is activated, the one or more DCI communications to the second wireless communication device using:
the second set of non-adaptive PDCCH resources, or
the second set of non-adaptive PDCCH resources and the second set of adaptive PDCCH resources.

28. The first wireless communication device of claim 27, wherein the one or more processors are further configured to:
receive, over a non-adaptive PDCCH resource, a communication that activates the first set of adaptive PDCCH resources and the second set of adaptive PDCCH resources;
wherein the one or more processors, when monitoring the first set of non-adaptive PDCCH resources or the first set of non-adaptive PDCCH resources and the first set of adaptive PDCCH resources, are configured to:
monitor the first set of non-adaptive PDCCH resources and the first set of adaptive PDCCH resources based at least in part on receiving the communication that activates the first set of adaptive PDCCH resources; and
wherein the one or more processors, when transmitting the one or more DCI communications using the second set of non-adaptive PDCCH resources or the second set of non-adaptive PDCCH resources and the second set of adaptive PDCCH resources, are configured to:
transmit the one or more DCI communications using the second set of non-adaptive PDCCH resources and the second set of adaptive PDCCH resources based at least in part on receiving the communication that activates the second set of adaptive PDCCH resources.

29. A wireless communication device for wireless communication, comprising:
a memory; and
one or more processors operatively coupled to the memory, the memory and the one or more processors configured to:
transmit, to a mobile termination (MT) function of an integrated access and backhaul (IAB) node, an indication of:
a first set of non-adaptive physical downlink control channel (PDCCH) resources for monitoring, and
a first set of adaptive PDCCH resources for monitoring after activation; and
transmit, to a distributed unit (DU) function of the IAB node, an indication of:
a second set of non-adaptive PDCCH resources for transmitting a downlink control information (DCI) communication, and
a second set of adaptive PDCCH resources for transmitting the DCI communication after activation.

30. The wireless communication device of claim 29, wherein the one or more processors are further configured to:
receive an indication that another wireless communication device is preparing to transmit ultra reliable low latency communication (URLLC) traffic along a route that includes the IAB node; and
transmit, to the MT function of the IAB node and based at least in part on receiving the indication that the other wireless communication device is preparing to transmit the URLLC traffic, a communication that activates the first set of adaptive PDCCH resources and the second set of adaptive PDCCH resources.

* * * * *